US010076750B2

(12) United States Patent
Singer et al.

(10) Patent No.: US 10,076,750 B2
(45) Date of Patent: Sep. 18, 2018

(54) PLUNGER FOR LOW-VOLUME SYRINGE PIPETTE

(71) Applicant: Austen BioInnovation Institute in Akron, Akron, OH (US)

(72) Inventors: Michael E. Singer, Canton, OH (US); Christine Flick, Streetsboro, OH (US)

(73) Assignee: AUSTEN BIOINNOVATION INSTITUTE IN AKRON, Akron, OH (US)

( * ) Notice: Subject to any disclaimer, the term of this patent is extended or adjusted under 35 U.S.C. 154(b) by 0 days.

(21) Appl. No.: 14/614,144

(22) Filed: Feb. 4, 2015

(65) Prior Publication Data

US 2015/0217289 A1    Aug. 6, 2015

Related U.S. Application Data

(60) Provisional application No. 61/935,601, filed on Feb. 4, 2014.

(51) Int. Cl.
*B01L 3/02* (2006.01)
*G01F 11/02* (2006.01)

(52) U.S. Cl.
CPC ........... *B01L 3/0224* (2013.01); *B01L 3/0234* (2013.01); *G01F 11/027* (2013.01); *B01L 2300/028* (2013.01)

(58) Field of Classification Search
CPC .... B01L 3/0224; B01L 3/0234; B01L 3/0231; B01L 2400/0478; B01L 2300/0832
See application file for complete search history.

(56) References Cited

U.S. PATENT DOCUMENTS

| | | | | |
|---|---|---|---|---|
| 3,732,735 A | * | 5/1973 | Cohen | B01L 3/0217 422/923 |
| 3,810,391 A | * | 5/1974 | Suovaniemi | B01L 3/0224 222/309 |
| 3,905,521 A | * | 9/1975 | Mead | B01L 3/0217 222/309 |
| 3,985,122 A | | 10/1976 | Topham | |
| 4,036,064 A | | 7/1977 | Hydo | |
| 4,679,446 A | | 7/1987 | Sheehan et al. | |
| 4,784,834 A | * | 11/1988 | Hirschmann | B01L 3/021 422/517 |

(Continued)

OTHER PUBLICATIONS

PCT International Search Report and Written Opinion from International Application PCT/US2015/014466, dated May 20, 2015, 11 pages.

(Continued)

*Primary Examiner* — Brian R Gordon
(74) *Attorney, Agent, or Firm* — Tucker Ellis LLP; Heather M. Barnes; Michael G. Craig

(57) ABSTRACT

One or more techniques and/or systems are disclosed for use with a syringe or pipette that may provide improved dispensing of fluids from the syringe or pipette. For example, typical syringes or pipettes can draw in a desired volume of fluid, and subsequently dispense the same volume. As described herein, a device can be configured to draw in a first volume and subsequently dispense the first volume and a second volume of fluid, such that portions of the fluid, such as liquids, that may be retained in the syringe or pipette can be displaces by the second volume.

20 Claims, 20 Drawing Sheets

(56) References Cited

U.S. PATENT DOCUMENTS

| | | | |
|---|---|---|---|
| 5,364,595 A * | 11/1994 | Smith | B01L 3/0275 422/513 |
| 5,511,433 A * | 4/1996 | Sabloewski | B01L 3/0224 73/864.14 |
| 5,763,278 A | 6/1998 | Sickinger et al. | |
| 6,428,750 B1 * | 8/2002 | Rainin | B01L 3/0224 222/154 |
| 6,506,611 B2 * | 1/2003 | Bienert | B01L 3/021 422/504 |
| 6,514,231 B1 | 2/2003 | Szapiro et al. | |
| 7,294,309 B1 | 11/2007 | Goldberg et al. | |
| 7,900,850 B2 | 3/2011 | Zengerle et al. | |
| 7,935,078 B2 | 5/2011 | Horita et al. | |
| 2001/0019845 A1 * | 9/2001 | Bienert | B01L 3/021 436/181 |
| 2002/0108455 A1 | 8/2002 | Suovaniemi et al. | |
| 2005/0220676 A1 | 10/2005 | Tran | |
| 2007/0048193 A1 | 3/2007 | Wilmer | |
| 2008/0226509 A1 * | 9/2008 | Sattler | B01L 3/50825 422/547 |
| 2009/0088693 A1 | 4/2009 | Carter | |
| 2012/0022447 A1 | 1/2012 | Oliver et al. | |

OTHER PUBLICATIONS

PCT International Preliminary Report on Patentability, International Application PCT/US2013/067255, dated May 14, 2015, 9 pages.

PCT International Search Report and Written Opinion from International Application PCT/US2013/067255, dated Jan. 24, 2014, 13 pages.

Hamilton Company, 7000 Series Modified Microliter Syringe, Product Data Sheet, Jul. 2007, 3 pages.

Idex Health & Science LLC, Innovadyne Nanodrop Express, Product Data Sheet, 2009, 2 pages.

PCT International Preliminary Report on Patentability, International Application PCT/US2015/014466, dated Aug. 18, 2016, 8 pages.

* cited by examiner

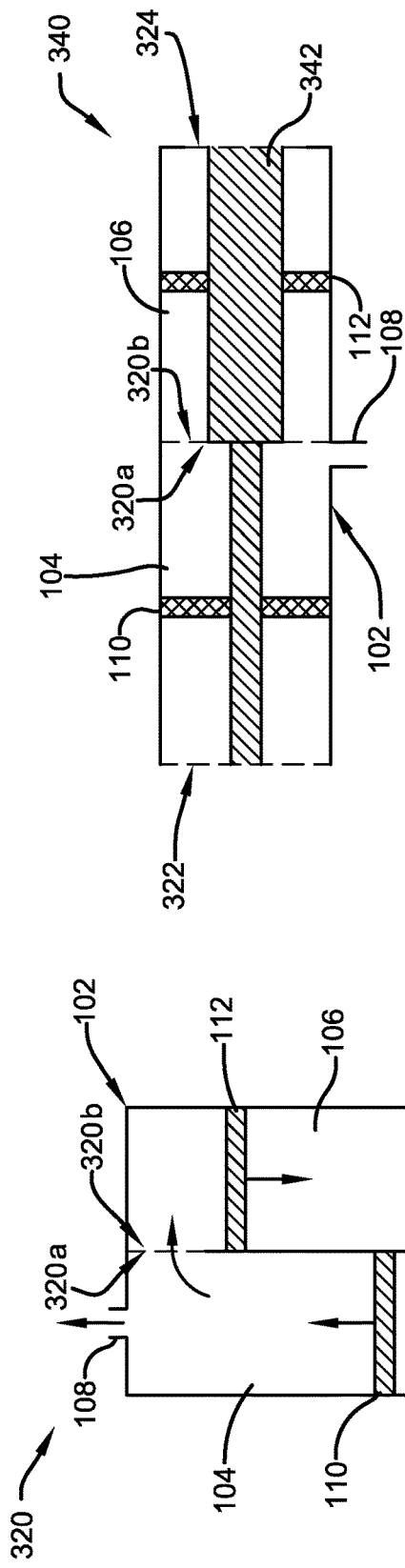
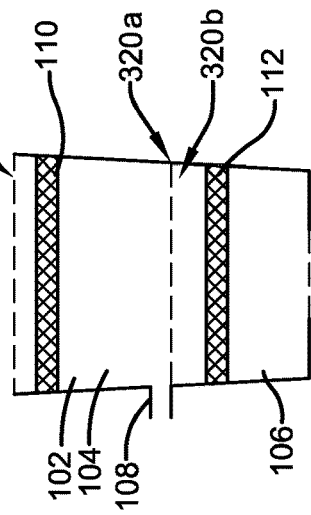
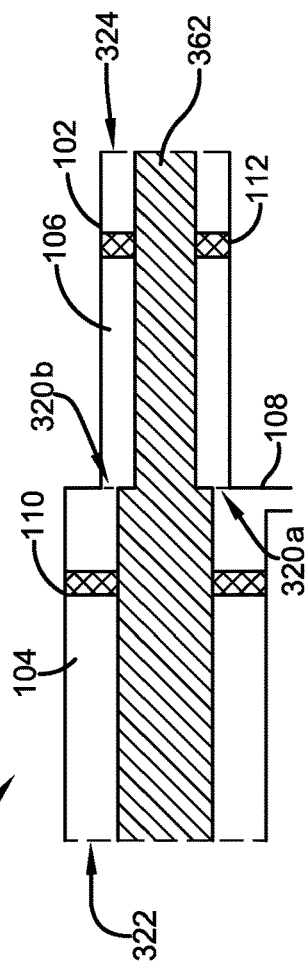
FIGURE 3B
FIGURE 3C
FIGURE 3D
FIGURE 3E

PLUNGER FOR LOW-VOLUME SYRINGE PIPETTE

CROSS-REFERENCE TO RELATED APPLICATIONS

This application claims priority to Provisional Patent Application, U.S. Ser. No. 61/935,601, entitled PLUNGER FOR LOW-VOLUME SYRINGE PIPETTE, filed Feb. 4, 2014, which is incorporated herein by reference.

BACKGROUND

Pipettes and syringes are common tools used in medicine, consumer products, and/or scientific research, for example, for injecting measured amounts of liquid and/or transporting a measured volume of liquid. These tools can be comprised of varying designs, depending on the intended use, for example, having differing volumes and/or levels of precision, for transferring small amounts or specified volumes of liquids or injecting very-low volumes of liquid. Further, they can be made from a variety of materials, including glass, polymers, metals, etc. and can also comprise more complex adjustable or automated pipettes. When drawing a liquid into the device, a partial vacuum may be created above the liquid-holding chamber to draw up, and subsequently inject/dispense the liquid.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, one or more devices and techniques for use with a syringe or pipette that may provide improved resolution in drawing and dispensing a low or specified volume of liquids. For example, typical syringes or pipettes utilize a one to one ratio when operating the actuator/plunger to draw or dispense liquids. As an example, a syringe or pipette may be configured to draw or dispense a low or specified volume while the actuator/plunger translates in a manner that is typical for a much larger volume. In this way, for example, the user can operate the device in a typical manner while merely dispensing a low or specified volume of liquid, thereby providing greater granularity in dispensing from the device.

Further, a user of a pipette (e.g., syringe) may draw a desired volume of fluid into a fluid holding chamber and desire to dispense substantially all of the volume of fluid held in the holding chamber. Occasionally, for example, due to liquid surface tension or some other form of attraction, a portion of the liquid may remain in the pipette or syringe upon application of a dispensing action, intending to dispense substantially all of the liquid from the pipette. When the fluid volume is targeted by the pipette, fluid retained in the pipette may yield an undesired result. Therefore, providing a blow-out volume may facilitate dispensing substantially all of the fluid from the pipette. That is, for example, the pipette may be configured to dispense a volume of fluid greater than the volume of fluid drawn into the pipette, thereby providing a blow-out volume dispensed subsequent to dispensing a primary volume, which is substantially equivalent to the volume of fluid drawn into the pipette.

In one implementation, an apparatus for use with a syringe or pipette can comprise a shaft that is configured to selectively engage with a pipette or syringe. Further, a first biasing component can be disposed on the shaft, and the first biasing component can be configured to provide a first biasing force between the shaft and the pipette or syringe. Additionally, a second biasing component can be disposed on the shaft, and the second biasing component can be configured to provide a second biasing force between a distal end of the shaft and a collar engaged with the shaft.

In one implementation, a plunger, which can be used by the syringe or pipette, can be configured to facilitate drawing a first volume of fluid into the pipette. Further, the plunger may be configured to facilitate dispensing the first volume of fluid from the pipette. Additionally, the plunger may be configured to facilitate dispensing a second volume of fluid from the pipette, subsequent to the dispensing of the first volume of fluid from the pipette, where the dispensing of the second volume of fluid may mitigate retention of drawn fluid by the pipette.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIGS. 3A, 3B, 3C, 3D and 3E are component diagrams illustrating example implementations of an apparatus for use with a syringe or pipette.

DETAILED DESCRIPTION

Figure 1A:
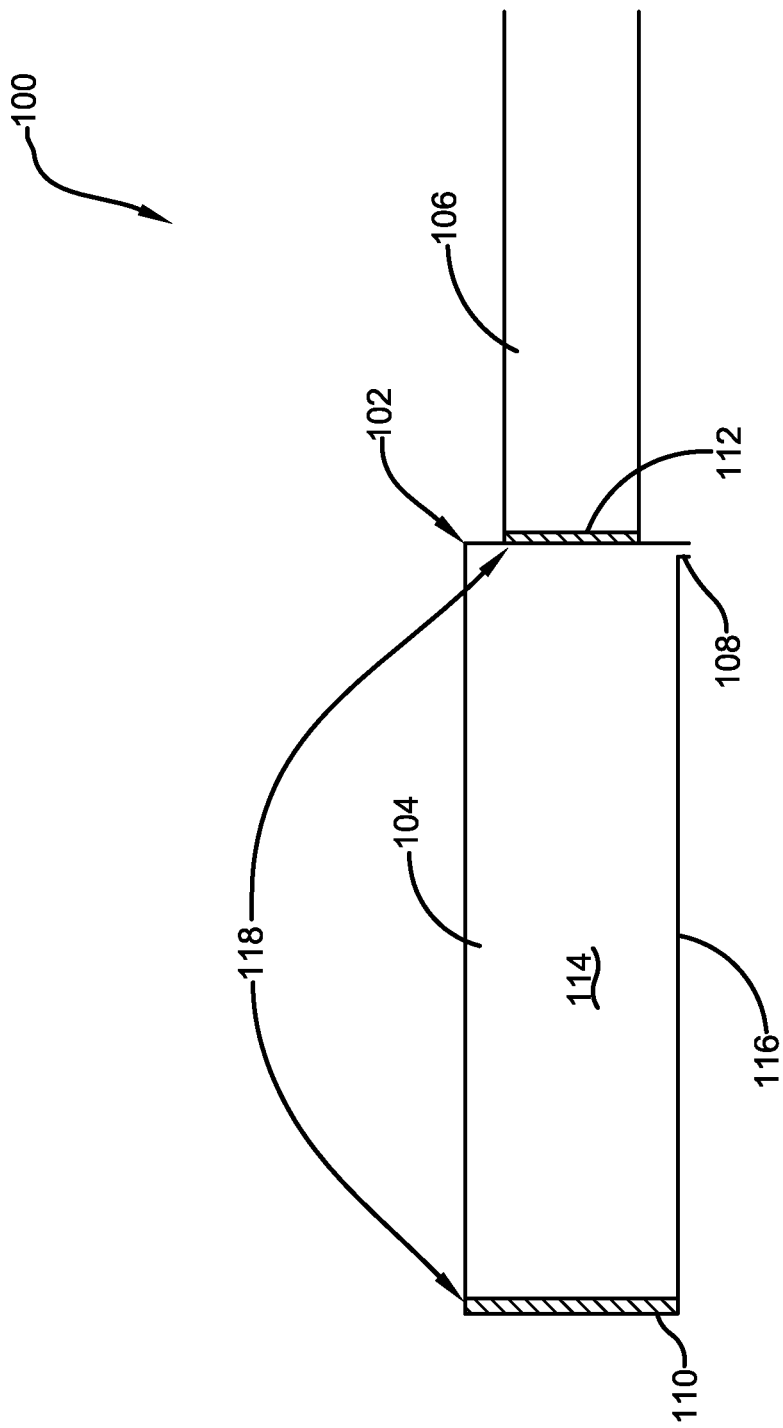
FIGS. 1A and 1B are component diagrams illustrating implementations of an exemplary apparatus for use with a syringe or pipette.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

An apparatus may be devised that can be used to transfer a desired volume of fluid, comprising, for example, what may typically be considered to be a low volume (e.g., ultra-low, such as less than a mililiter) or specified volume of fluid in conjunction with medical, consumer, and/or scientific research utilization. As one example, a pipette-type application use of the apparatus may utilize chambers comprising different volumes, where the difference in volumes may comprise a volume of fluid displaced by the apparatus (e.g., either into or out-of the pipette). In this example, the displaced volume may comprise a small fraction of the total volume of the chamber. This may allow for a relatively normal use of a coupled actuator (e.g., plunger), while providing fine grained transfer of a fluid. Further, for example, graduation indicators on the pipette, for example, may provide visual identification of the desired low-volume for a user.

Figure 1B:
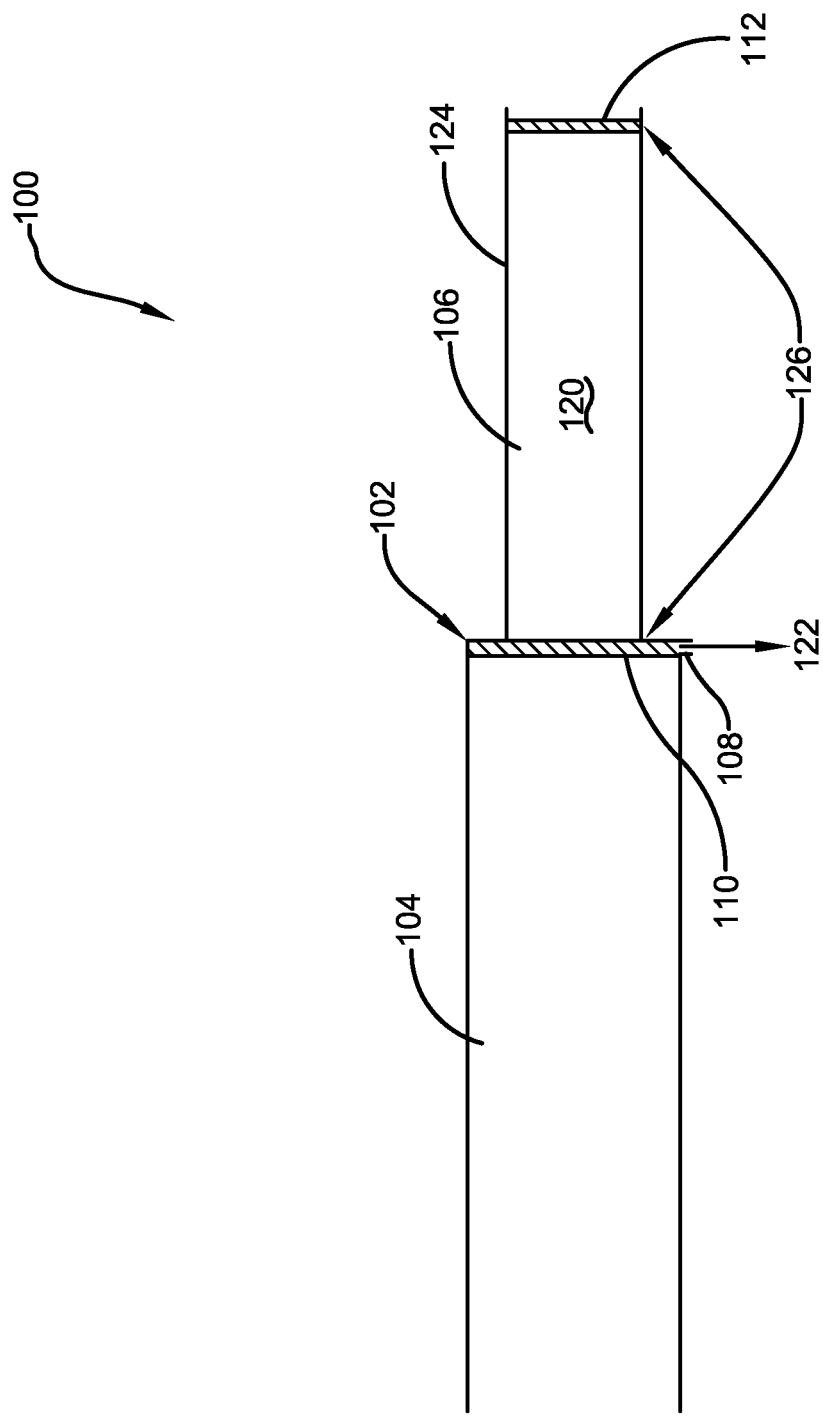

FIGS. 1A and 1B are component diagrams illustrating example implementations of an exemplary apparatus 100 for use with a syringe or pipette. In FIGS. 1A and 1B, the exemplary apparatus 100 comprises a chamber body 102. The chamber body 102 comprises a first chamber 104, a second chamber 106, and a fluid port 108. In one implementation, as illustrated in the exemplary apparatus 100 of FIGS. 1A and 1B, the first chamber 104 and second chamber 106 can be disposed in a sequential arrangement, for example, such that they share a similar central, longitudinal axis. However, the arrangement of the first chamber 104 and second chamber 106 is not limited to this example implementation. In other implementations, the respective chambers may be arranged in a geometrically parallel disposition, for example, such that the respective chambers are coupled side-by-side. As another example, the first chamber (e.g., 104) may be disposed orthogonal to the second chamber (e.g., 106). It is anticipated that those skilled in the art may devise alternate arrangements for the respective chambers implemented in the apparatus used in the pipette or syringe. For example, the chambers may be aligned at a desired angle (e.g., any angle designed for a particular purpose) to each other; and/or the chambers' axes may not be aligned with each other (e.g., the axis may be offset from each other).

In FIG. 1A, the chamber body 102 of the exemplary apparatus 100 comprises a third volume 114. The third volume 114 can be defined by at least a first chamber wall 116, the first seal 110, and the second seal 112, when the first seal 110 and second seal 112 are disposed in a first position 118, respectively. Further, as illustrated in FIG. 1B, the third volume 114 (from FIG. 1A) can be defined by a sum of a fourth volume 120, which can be defined by at least a second chamber wall 124, the first seal 110, and the second seal 112, and a fifth volume 122 comprising fluid displaced at the fluid port 108, when the first seal 110 and second seal 112 are disposed in a second position 126, respectively.

As an illustrative example, in FIGS. 1A and 1B, the third volume can be defined differently depending on a position of the first seal 110 and second seal 112 in the chamber body. That is, for example, when the first and second seals 110, 112 are disposed in the first position 118, substantially the entire third volume is disposed in within the first chamber 104. Alternately, when the first and second seals 110, 112 are disposed in the second position 126, the third volume can be divided between the second chamber 106 and the volume displaced at the fluid port 108.

In one implementation, translating the first and second seals 110, 112 between the first position 118 and the second position 126 may effectively force a portion of the third volume 114 to be displaced at the fluid port 108. As an example, a third volume of fluid disposed in the first chamber 104 may be displaced into the second chamber 106 and out of the fluid port 108 when the first and second seals 110, 112 are translated between the first position 118 and the second position 126. That is, in this example, a first fraction of the third volume of fluid can be displaced into the second chamber 106 and a second fraction of the third volume of fluid can be displaced at (e.g., out of) the fluid port 108. It should be noted that the term "fluid" may be representative of any fluid (e.g., liquid, gas, plasma) that is typically indicated by the study of fluid mechanics. Nonlimiting examples of fluid that may be used with the present invention may include water, medicinal fluids, solutions, paint, adhesives, lubricating fluids, oil, grease, sealants, coatings and the like.

Figure 2:
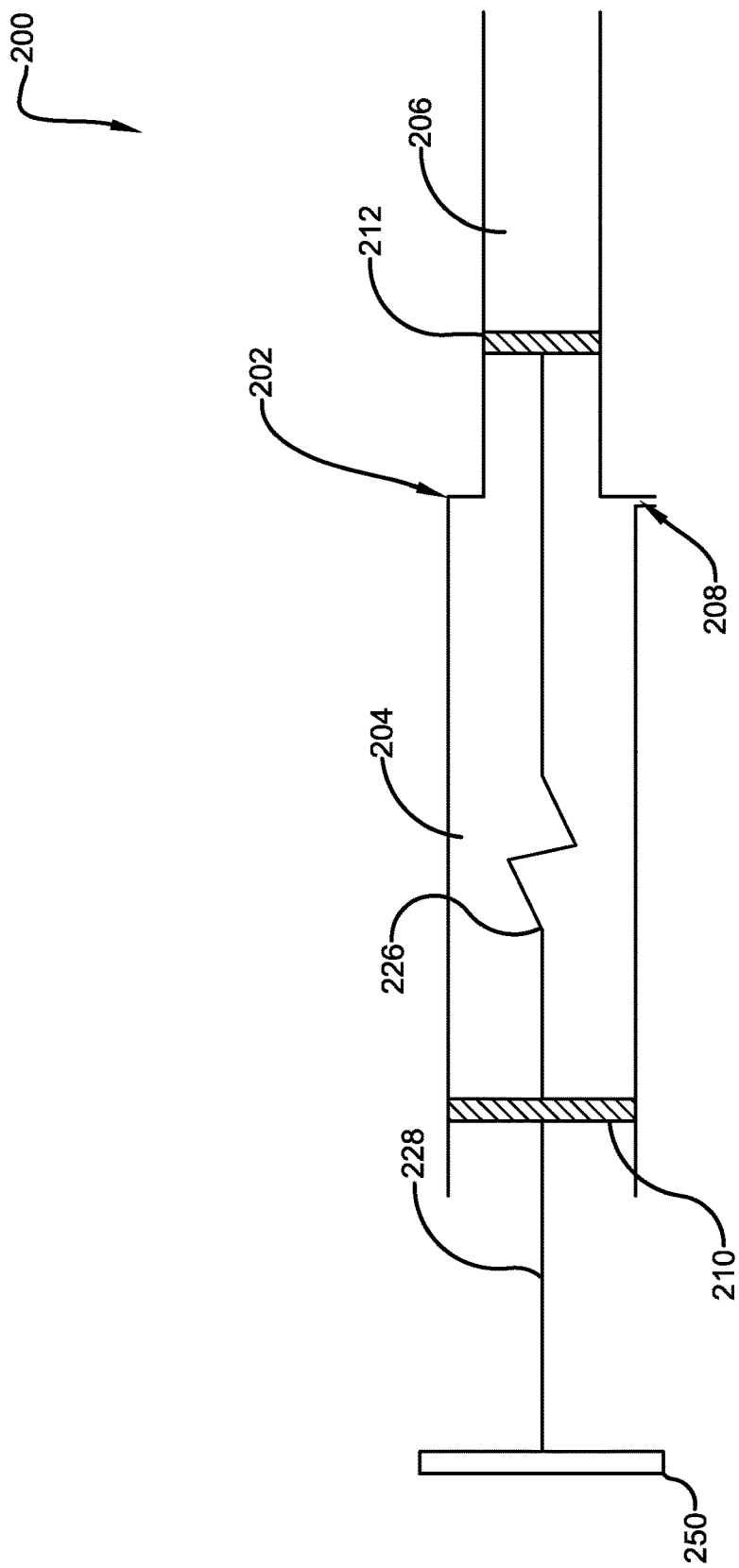
FIG. 2 is a component diagram illustrating an example implementation of an apparatus for use with a syringe or pipette.

FIG. 2 is a component diagram illustrating an example implementation 200 of an apparatus for use with a syringe or pipette. With continued reference to FIGS. 1A, 1B, in one implementation, as illustrated in FIG. 2, a first seal 210 can be operably coupled 226 with a second seal 212, such that the second seal 212 may be translated in a second chamber 206 of a chamber body 202 in proportion to a translation of the first seal 210 in a first chamber 204 of the chamber body. That is, for example, translating the first seal 210 inside the first chamber 204 (e.g., either toward or away from the second seal 212) will result in the second seal 212 being translated in a same manner (e.g., either toward or away from the first seal 210) in the second chamber 206.

In one implementation, the translation of the first seal 210 in the first chamber 204 can result in a substantially equivalent translation of the second seal 212 in the second chamber 206. As an example, if the first seal 210 is translated in a first direction a, a third distance b in the first chamber 204, the second seal 212 will be translated in the first direction a, a distance substantially equivalent to the third distance b in the second chamber 206. In this implementation, for example, the first seal 210 may be operably coupled 226 to the second seal 212 by a type of rigid assembly, such as bar, rod, wire, or otherwise direct-drive connector assembly that allows the two seals 210, 212 to move in concert with each other in the same direction and over the same relative distance.

In one implementation, the translation of the first seal 210 in the first chamber 204 may result in a proportional and non-equivalent translation of the second seal 212 in the second chamber 206. As an example, if the first seal 210 is translated in the first direction a, the third distance b in the first chamber 204, the second seal 212 may be translated in the first direction a, a fourth distance c in the second chamber 206, where c is substantially proportional to the third distance b, but where the fourth distance c is not equivalent to the third distance b. That is, the third distance b may be greater than or less than the fourth distance c, for example, where the relationship between the third distance b and the fourth distance c may be represented as a ratio b:c. In this implementation, for example, the first seal 210 may be operably coupled 226 to the second seal 212 by a type of non-rigid assembly, such as spring assembly, gear assembly, or otherwise non-direct drive connector that allows the two seals 210, 212 to move in the same direction, but at different relative translation rates.

In one implementation, the first chamber 204 and the second chamber 206 may comprise a substantially similar dimension, such as a diameter. For example, a diameter of the chamber body 202 may comprise a non-varying diameter barrel. In one implementation, the first seal 210 may be operably coupled 226 to the second seal 212 by a type of variable length link, further coupled with the actuator 228. For example, the variable length link can couple the first seal 210 and second seal 212 in the non-varying diameter barrel of the chamber body 202. In this example, using the actuator 228 to translate the first seal 210 in the first chamber 204 may result in a substantially proportional translation of the second seal 212 in the second chamber 206.

In one implementation, as illustrated in the example, 200 of FIG. 2, actuator 228 may be operably coupled with the first seal 210. The actuator 228 can be configured to apply a translation force to the first seal 210. As an example, the actuator 228 may be coupled with a user interface 250 (e.g., a grip, such as a thumb press) to which the user can apply the translation force (e.g., in or out). In this example, applying the translation force inward may result in the first seal 210 being translated toward the fluid port 208 (e.g., and therefore resulting in the second seal 212 translating forward). Further, applying the translation force to the actuator 228 outward (e.g., pulling the user interface 250) can result in the first seal 210 being translated away from the fluid port 208.

Figure 3A:
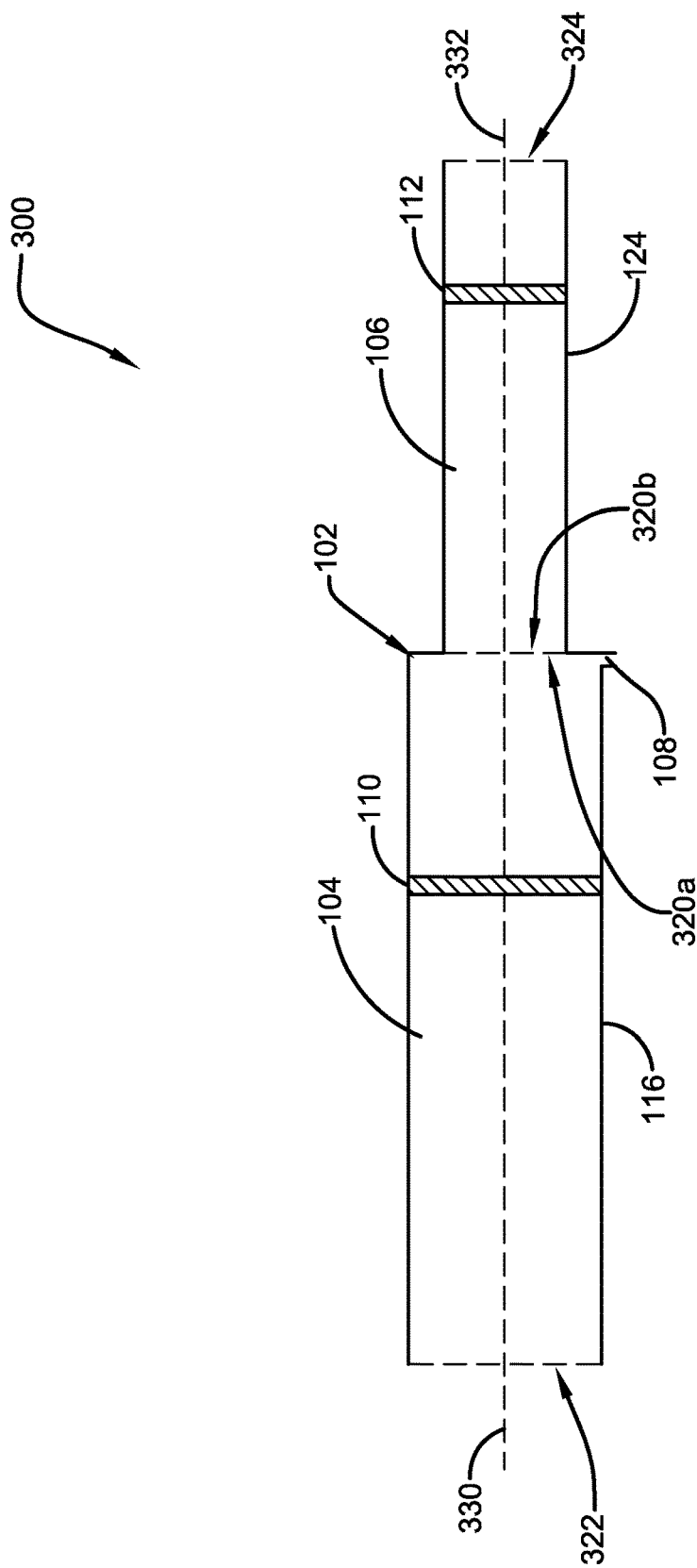

FIG. 3A is a component diagram illustrating an example implementation 300 of an apparatus for use with a syringe or pipette. With continued reference to FIGS. 1A, 1B and 2, in one implementation, as illustrated in FIG. 3A, the first seal 110 (e.g., 210 of FIG. 2) can be configured to slidably translate along a central, longitudinal axis 330 of the first chamber 104. Further, the second seal 112 (e.g., 212 of FIG. 2) can be configured to slidably translate along a central, longitudinal axis 332 of the second chamber 106.

In one implementation, as illustrated in FIG. 3A, the central, longitudinal axis 330 of the first chamber 104 may be axially aligned with the central, longitudinal axis 332 of the second chamber 106. In other implementations, the central, longitudinal axis 330 of the first chamber 104 may be aligned in parallel (e.g., geometrically) with the central, longitudinal axis 332 of the second chamber 106. In another implementation, the central, longitudinal axis 330 of the first chamber 104 may be aligned orthogonally to the central, longitudinal axis 332 of the second chamber 106.

FIGS. 3B-3E are component diagrams illustrating alternate example implementations 320, 340, 360, 380 of an apparatus for use with a syringe or pipette. In the example implementation 320 of FIG. 3B, the first chamber 104 is disposed adjacent to (e.g., parallel to) the second chamber 106 of the chamber body 102. In this implementation, for example, the first seal 110 and second seal 112 may be configured to translate in their respective chambers in opposite directions when fluid is displaced at the fluid port. Further, in this implementation, the second end 320a, 320b of the respective chambers can comprise an opening in a chamber wall between the respective chambers 104, 106, for example.

In another implementation 340, as illustrated in FIG. 3C, the first and second chambers 104, 106 may comprise a donut shape, for example, where a central portion of the respective chambers comprises a separate, central chamber 342 (e.g., of filled portion), that is not fluidly coupled with the first and second chambers 104, 106. In this implementation, for example, a varying-sized central chamber 342 may be configured to allow the second chamber 106 to have a smaller volume than the first chamber 104. Further, in this implementation the first and second seals 110, 112 can be configured to accommodate the central chamber 342, for example, by comprising donut-shaped configuration. FIG. 3D illustrates another example implementation 360, where the chamber body comprises an alternate central chamber 362 design. In this implementation, the chamber body 102 and the alternate central chamber 362 comprise a varied width (e.g., diameter), thereby accommodating a different volume for the first and second chamber 104, 106.

FIG. 3E comprises another example implementation 380, where the width (e.g., diameter) of the chamber body 102 constantly decreases from the first end 322 of the first chamber 104 to the first end 324 of the second chamber 106. As an illustrative example, in this implementation, the chamber body may comprise a frustoconical shape. Further, in this implementation, the first seal 110 and the second seal 112 may respectively be configured to deform (e.g., contract and expand) in a manner that allows them to continue to provide a fluid seal when translating along the constantly decreases width of the chamber body 102. In one implementation, a variable length linked coupling (e.g., described above in FIG. 2) may be disposed in the chamber body 102 that comprises constantly decreasing diameter. Further, in one or more implementations, the variable length linked coupling, or a rigidly linked coupling (e.g., described above in FIG. 2) may be implemented in any of the example implementations described herein.

It will be appreciated that the apparatuses, devices, and methods, described herein, are merely limited to the example implementations described herein. It is anticipated that those skilled in the art may devise alternate arrangements and shapes for the chambers and chamber bodies, etc. For example, the chamber body (e.g., in cross-section) may comprise a circle, oval, square, rectangle, triangle, or some other polygon shape configured to provide a desired operation. Further, for example, the first and second chambers 104, 106 may be arranged in a variety of ways, such as sequentially, in parallel (e.g., geometrically), one inside the other, etc. Additionally, in one implementation, the first and second chamber 104, 106 may respectively comprise different diameters geometries. For example, the first chamber 104 may comprise a first diameter geometry (e.g., round) and the second chamber 106 may comprise a second diameter geometry (e.g., donut-shaped).

As illustrated in FIG. 3A, the first chamber 104 can comprise at least a first chamber wall 116, a first end 322, and a second end 320a. In one implementation, the first end 322 can comprise an opening to the outside of the chamber body 102. As an example, the first end 322 of the first chamber 104 may comprise an opening that comprises a fluid communication between the inside of the first chamber 104 and the outside of the chamber body 102, such that a fluid may pass from the first chamber 104 to the outside. As an illustrative example, as illustrated in FIG. 3A, if the first seal 110 is slidably translated toward the first end 322, and the space between the first seal 110 and the first end 322 comprised a fluid gas (e.g., air), the fluid gas may be displaced from inside the first chamber 104 to the outside at the first end 322.

In one implementation, the second end 320a of the first chamber 104 can comprise an opening in fluid communication with the second chamber 106. Further, the second chamber 106 can comprise at least a second chamber wall 124, a first end 324, and a second end 320b. In one implementation, the second end 320b may comprise an opening that is in fluid communication with the first chamber 104. That is, for example, the second end 320a of the first chamber 104 may be adjacent to (e.g., and congruent with) the second end 320b of the second chamber 106.

As an illustrative example, as illustrated in FIG. 3A, if the first seal 110 is slidably translated toward the second end 320a, and the space between the first seal 110 and the second end 320a comprised a fluid (e.g., gas such as air; or fluid liquid), at least a portion of the fluid may be displaced from the first chamber 104, through opening at the second end 320a/320b, into the second chamber 106 (e.g., and another portion of fluid may be displaced out of the chamber body 102 through the fluid port 108). As another example, if the first seal 110 is slidably translated toward the first end 322, thereby resulting in the second seal to be translated toward its second end 320b, fluid disposed in the second chamber, between the second seal 112 and the second end 320b, may be displaced from the second chamber 106, through opening at the second end 320b/320a, into the first chamber 104 (e.g., and fluid may be displaced into the first chamber 104 from outside the chamber body 102 through the fluid port 108).

It will be appreciated that, while particular implementations have been illustrated and described, herein, the shape, size and/or dimensions of the exemplary pipette or syringe may not be limited to these example implementations. For example, the fluid port may be implemented in a variety of locations and having various dimensions, comprising various diameters, shapes, and/or lengths. Several example implementations are described below. As an example, the fluid port may comprise a connection means that allows the fluid port to be operably coupled with a device for use in transfer and/or injection of fluids. As another example, the fluid port may be coupled with an elongated tube used to visually observe an amount of fluid displaced through the fluid port.

In one implementation, the first end 324 of the second chamber 106 can comprise an opening to the outside of the chamber body 102. As an example, the first end 324 of the second chamber 106 may comprise an opening that comprises a fluid communication between the inside of the second chamber 106 and the outside of the chamber body 102, such that a fluid may pass from the second chamber 106 to the outside. As an illustrative example, as illustrated in FIG. 3A, if the second seal 112 is slidably translated toward the first end 324, and the space between the second seal 112 and the first end 324 comprised a fluid gas (e.g., air), the fluid gas may be displaced from inside the second chamber 106 to the outside of the chamber body 102, at the first end 324.

Figure 4A:
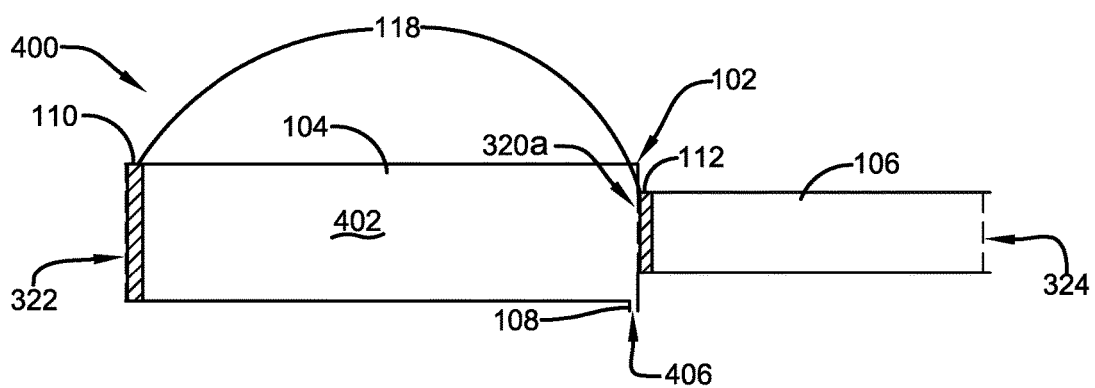
FIGS. 4A, 4B and 4C are component diagrams illustrating example implementations of an apparatus for use with a syringe or pipette.
Figure 4B:
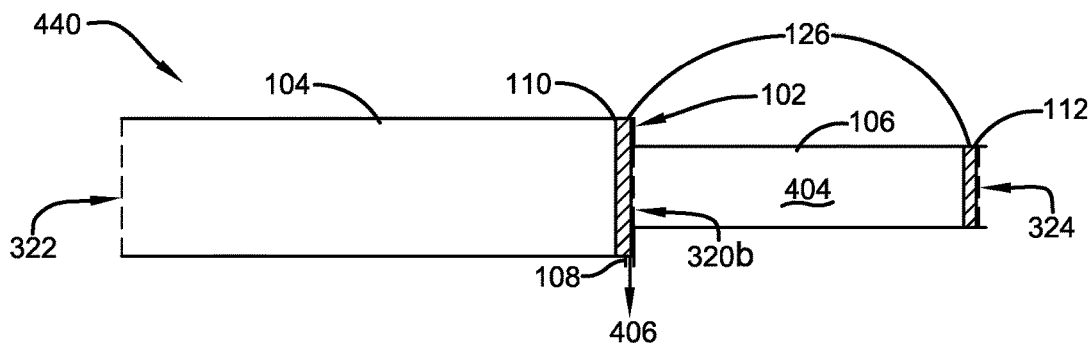
Figure 4C:
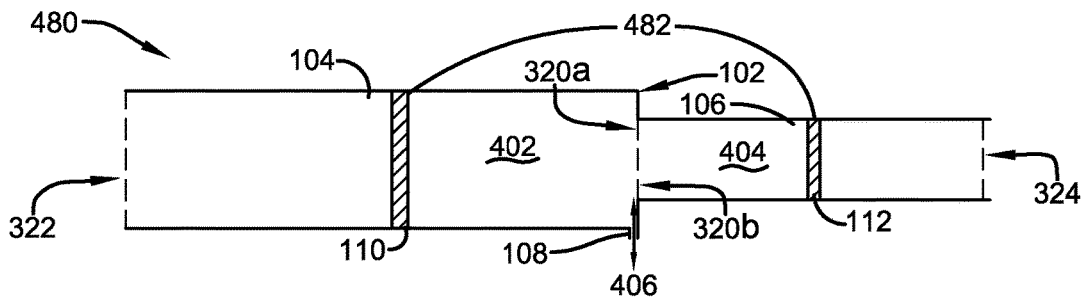

FIGS. 4A-4C are component diagrams illustrating example implementations 400, 440, 480 of an apparatus for use with a syringe or pipette. With continued reference to FIGS. 1A, 1B, 2, and 3A-3E, in one implementation, as illustrated in FIGS. 4A and 4B, the first position 118 of the first seal 110 and the second seal 112 can comprise the first seal 110 disposed at the first end 322 of the first chamber 104, and the second seal 112 disposed at the second end 320b of the second chamber 106. Further, in one implementation, the second position 126 of the first seal 110 and the second seal 112 can comprise the first seal 110 disposed at the second end 320a of the first chamber 104, and the second seal 112 disposed at the first end 324 of the second chamber 106.

As illustrated in FIGS. 4A-4C, in one implementation, the first chamber 104 comprising a sixth volume 402 defined by the first seal 110 and the second end 320a of the first chamber 104. Further, the second chamber 106 can comprise a seventh volume 404 defined by the second seal 112 and the first end 324 of a second chamber 106. Additionally, the fluid port 108 can be configured to transfer an eighth volume 406 between the inside of the chamber body 102 and the outside of the chamber body 102. In one implementation, the third volume 114 is substantially equivalent to the sum of the sixth volume 402, the seventh volume 404 and the eighth volume 406, during translation of the first seal 110 and second seal 112.

As an illustrative example, the third volume 114, as illustrated in FIG. 1A, is substantially equivalent to the sixth volume 402, as illustrated in FIG. 4A, when the first seal 110 and second seal 112 are disposed in the first position 118. Therefore, in this example, the seventh volume 404 and eighth volume 406 may respectively comprise zero. Alternately, when the first seal 110 and second seal 112 are disposed in the second position, as illustrated in FIG. 4B (e.g., and FIG. 1B), the sixth volume 402 may comprise zero, and the third volume 114 may be substantially equivalent to the sum of the seventh volume 404 and the eighth volume 406. Further, the first and second seal 110, 112 may be disposed in a third position 482, comprising a position between the first position 118 and the second position 126.

That is, in the example 440 of FIG. 4B, the amount of fluid displaced (e.g., 406) from inside the chamber body 102 to outside, via the fluid port 108, may comprise the difference between the sixth volume 402 (from example, 400) and the seventh volume 404 (from example 440). However, in the example 480 of FIG. 4C, the amount of fluid displaced from inside the chamber body 102 to outside, via the fluid port 108, may comprise the difference between the third volume 114 and the sum of sixth volume 402 and the seventh volume 404.

In one implementation, the volume difference between the sixth and seventh volumes 402, 404, can be dictated by a size of the respective first and second chambers 104, 106. This difference, for example, can dictate the amount of fluid displaced at the fluid port 108. In one implementation, the ratio of the third volume 114 to the fifth volume 122 (e.g., displaced at the fluid port) can comprise ten to one or greater (>10:1), one hundred to one or greater (>100:1), one-thousand to one or greater (>1,000:1), or ten-thousand to one or greater (>10,000:1) (e.g., or some other ratio). As an example, a syringe and/or pipette may be devised that can displace (e.g., draw and/or discharge) in a granularity of microliters ($\mu$l), while the chamber body (e.g., 102) may displace in a granularity of milliliters (ml) (e.g., between the first and second chambers 104, 106).

As an illustrative example, the chamber body (e.g., 102) of the syringe and/or pipette may comprise a first chamber (e.g., 104) configured to hold a sixth volume (e.g., 402) of 10 ml, and second chamber (e.g., 106) configured to hold the seventh volume (e.g., 404) of 9.99 ml, which would result in an eighth volume (e.g., 406) of 10 $\mu$l. In this example, translating the first seal (e.g., 110) from the first end (e.g., 322) of the first chamber to the second end (e.g., 320a) of the first chamber (e.g., and therefore resulting in the translation of the second seal (e.g., 112) from the second end (e.g., 324) of the second chamber to the second end (e.g., 320b) of the second chamber) would result in 10 μl being displaced (e.g., discharged) from the first chamber to the outside of the chamber body at the fluid port (e.g., 108). Conversely, translating the first seal from the second end of the first chamber to the first end of the first chamber (e.g., and therefore resulting in the translation of the second seal from the first end of the second chamber to the second end of the second chamber) would result in 10 μl being displaced (e.g., drawn) into the first chamber from the outside of the chamber body at the fluid port.

A syringe or pipette may be devised that can be used to transfer a low volume (e.g., ultra-low volume) of fluid when compared with an amount of fluid internally displaced by actuation of the syringe or pipette. That is, for example, a user of the syringe or pipette may be able to apply a force vector to an actuator that is typical of a large volume transfer, but it result in merely a low volume transfer (e.g., collection or dispersal) of the fluid (e.g., liquid, gas, plasma).

Figure 5A:
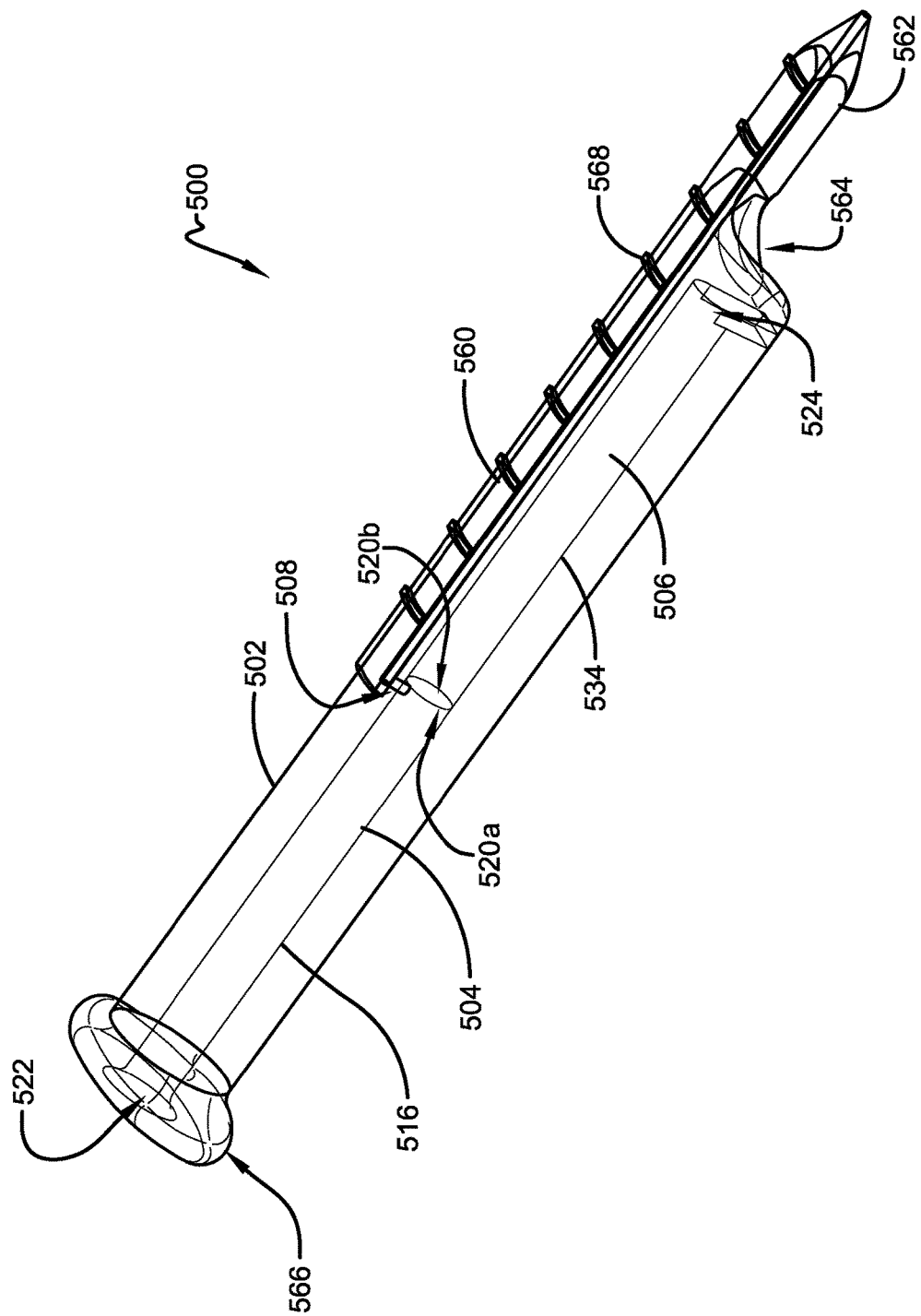
FIG. 5A is a perspective illustration of at least a portion of an example pipette device, which comprises one or more portions the systems described herein.
Figure 5B:
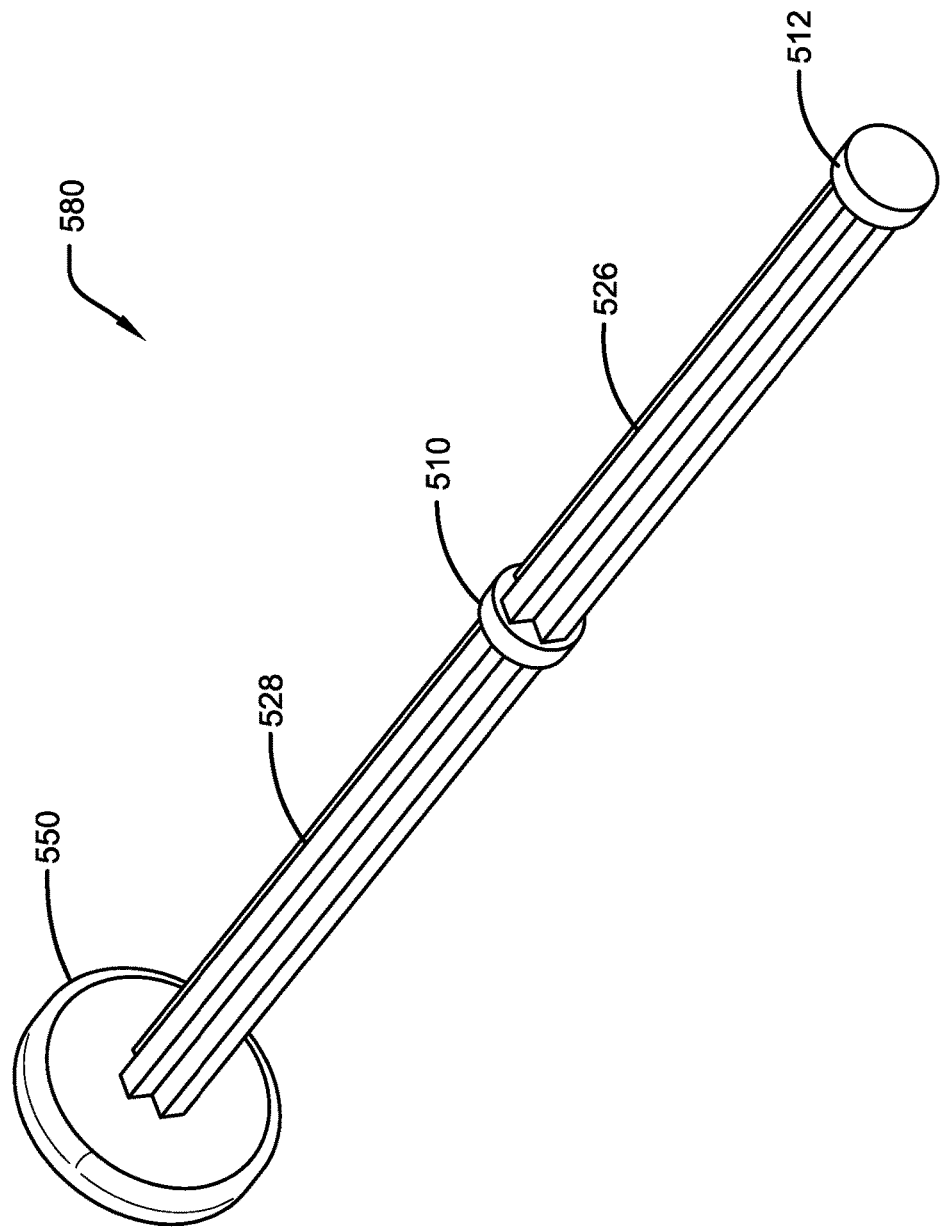
FIG. 5B is a perspective illustration of at least a portion of an example pipette device, which comprises one or more portions the systems described herein.
Figure 6:
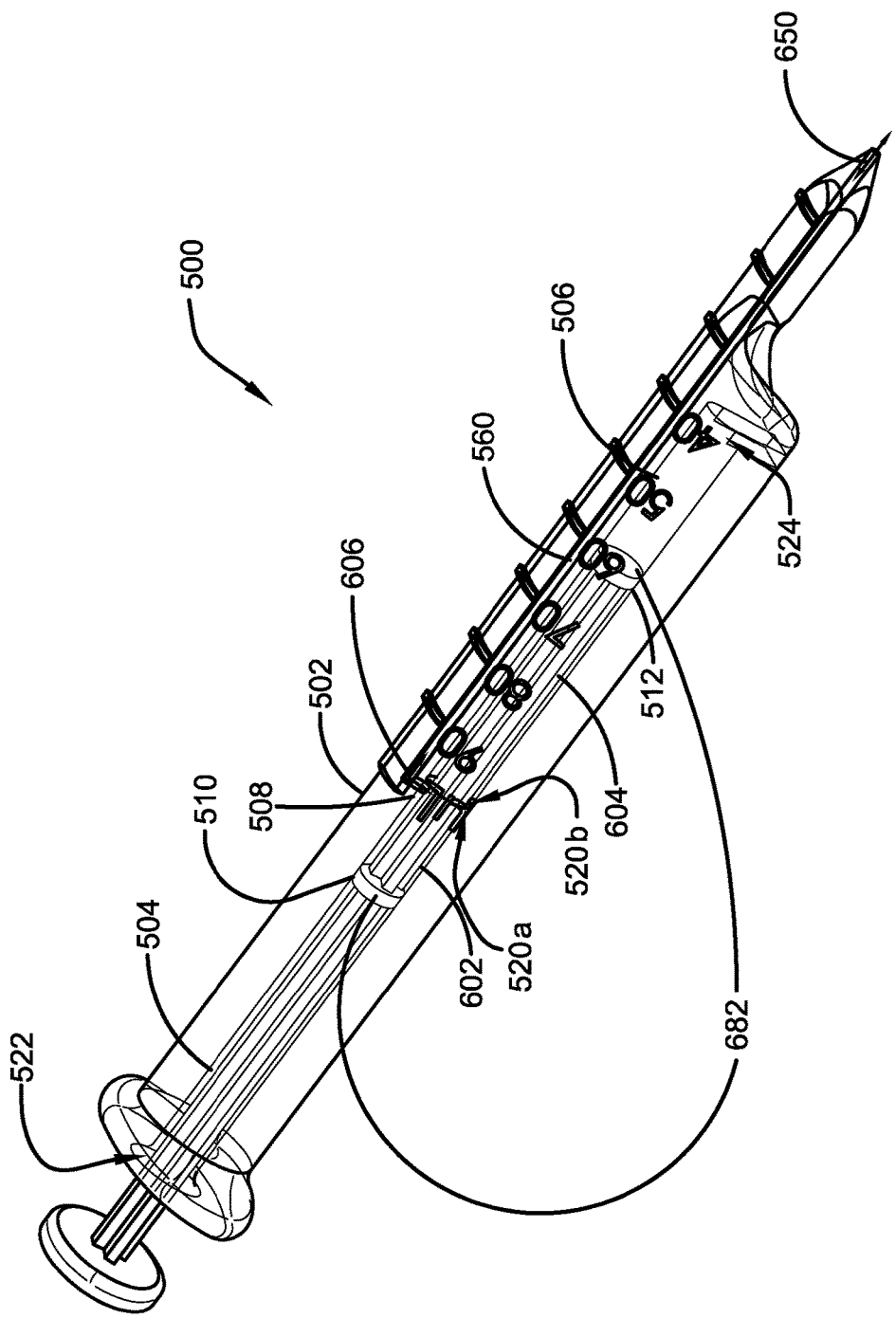
FIG. 6 is a perspective illustration of one or more portions of an example pipette device, which comprises one or more portions the systems described herein.

FIGS. 5A, 5B and 6 are perspective illustrations of one or more portion of an example pipette device 500, which comprise one or more portions the systems described herein. In this example implementation 500, in FIG. 5A, a first chamber 504 (e.g., 104 of FIG. 1) and second chamber 506 (e.g., 106 of FIG. 1) are comprised in a chamber body 502 (e.g., 102 of FIG. 1). The first chamber comprises a first chamber wall 516, a first end 522, and a second end 520a. The second chamber 506 comprise a second chamber wall 534, a first end 524, and a second end 520b, where the second chamber 506 is in fluid communication with the first chamber 504. Further, the example pipette device 500 comprises a fluid port 508 (e.g., 108 of FIG. 1) that is disposed in fluid communication with the first chamber 504 and the outside of the first and second chambers 504, 506.

In FIG. 5B, an example device 580 comprises a first seal 510 and a second seal 512. As illustrated in FIG. 6, the first seal 510 can be disposed in the first chamber 504, and may be configured to provide a fluid seal between the first end 522 and the second end 520a of the first chamber 504. Further, the first seal 510 can be configured to translate between the first end 522 and the second end 520a of the first chamber 504 to facilitate displacing fluid from the first chamber 504. As shown in FIG. 6, the second seal 512 can be disposed in the second chamber 506, and may be configured to provide a fluid seal between the first end 524 and the second end 520b of the second chamber 506. Additionally, the second seal 512 can be configured to translate between the first end 524 and the second end 520b of the second chamber 506 to facilitate displacing fluid from the second chamber 506.

In one implementation, the first seal 510 can be configured to facilitate displacement of fluid (e.g., gas, such as air; liquid; or plasma) from the first chamber 504 and into the second chamber 506 and/or the fluid port 508. Further, the first seal 510 can be configured to facilitate replacement of fluid into the first chamber 504 from the second chamber 506 and/or the fluid port 508. That is, for example, the first chamber 504 may comprise a third volume of fluid 602 disposed between the first seal 510 and the second end 520a of the first chamber 504.

In this example, when the first seal 510 is translated from the first end 522 toward the second end 520a, the third volume of fluid 602 may be displaced into the second chamber 506 and the fluid port 508; resulting in a fourth volume of fluid 604 in the second chamber 506, and a fifth volume of fluid 606 at the fluid port 508. Further, in this example, the amount of fluid displaced from the first chamber 504 (e.g., the third volume of fluid 602) may be substantially equivalent to the fourth volume of fluid 604 and the fifth volume of fluid 606.

As another example, when the first seal 510 is translated from the second end 520a toward the first end 522, the fourth volume of fluid 604 may be displaced into the first chamber 504 from the second chamber, and the fifth volume of fluid 606 may be displaced from the fluid port 508. This can result in the third volume of fluid 602 in the first chamber 504. Further, in this example, the amount of fluid displaced into the first chamber 504 (e.g., the third volume of fluid 602) may be substantially equivalent to the fourth volume of fluid 604 from the second chamber 506 and the fifth volume of fluid 606 from the fluid port 508. In one implementation, the fifth volume of fluid 606, displaced at the fluid port 508, upon translation of the first seal 510 in the first chamber 504 may be substantially equivalent to the difference between the sum of the third volume of fluid 602 and fourth volume of fluid 604, when the first seal 510 is disposed at the second end 520a, and the sum of the third volume of fluid 602 and fourth volume of fluid 604, when the first seal 510 is disposed at the first end 522.

As illustrated in FIGS. 5B and 6, the first seal 510 can be operably coupled 526 with the second seal 512. The coupling 526 between the first seal 510 and the second seal 512 can be configured to facilitate in translation of the second seal 512 at a substantially similar rate as a translation of the first seal 510. That is, for example, when an actuator 528, which is operably coupled with the first seal 510, is activated by applying a translation force, such as at an activator grip 550, the translation force is applied to the first seal 510. In this example, the translation force applied to the first seal may result in a translation force being applied to the coupling 526. This, in-turn, can apply a translation force to the second seal 512 at a substantially similar rate, resulting in the first and second seals 510, 512 being translated in their respective chambers 504, 506 at substantially similar rate. In another implementation, the coupling 526 between the first seal 510 and the second seal 512 may be configured to facilitate translation of the second seal 512 at a rate proportional to the rate of translation of the first seal 510.

Further, as illustrated in FIGS. 5A, 5B and 6, the second end 520b of the second chamber 506 comprise an opening in fluid communication with an opening in the second end 520a of the first chamber 504. Further, the first end 522 of the first chamber 504 can comprise an opening in fluid communication with the outside of the first chamber 504. Additionally, the first end 524 of the second chamber 506 can comprise an opening in fluid communication with the outside of the second chamber 506.

In one implementation, as illustrated in FIG. 6, the fluid port 508 can be configured to be fluidly coupled with a graduated chamber 560, where the graduated chamber 560 can be configured to hold fluid in a visually demarcated position 568. For example, the exemplary pipette device 500 can be configured to draw fluid 650 (e.g., a desired target liquid) into the graduated chamber 560, such as by drawing the grip 550, which, in-turn, can translate the first seal 510 and second seal 512, drawing the fifth volume of fluid 606 across the fluid port 508 and into the first chamber 504. In this example, the amount of fluid 650 drawn into the pipette may be substantially equivalent to the fifth volume of fluid 606. The volume of fluid 650 drawn into the pipette can be visually observed in the graduated chamber 560, for example.

In one implementation, a volume comprised in the graduated chamber 560 may be substantially equivalent to (e.g., or greater than) the fifth volume of fluid 606 translated across the fluid port 508. For example, the difference between the volume displaced at the first chamber 504 and the volume displace at the second chamber 506, when the first seal 510 and second seal 512 are translated in the respective chambers, should be less than or equal to the volume comprised in the graduated chamber 560. In this way, for example, a fluid transferred or by the pipette or syringe device may not be displaced into the interior of the chamber body 502. As another example, where the fifth volume 606 is one hundred microliters (1000) the volume of the graduated chamber 560 should be greater than or equal to $\pi r^2 \times$length of the graduated chamber 560.

In one implementation, as illustrated in FIGS. 5A, 5B and 6, the example pipette device 500 may comprise user interface features 564, 566, which may be configured to allow a user to appropriately grip the pipette device 500 during use. For example, one or more of a user's fingers or other portions of the user's hand may be placed at the user interface features 564, 566, which may allow for an ergonomic use of the device.

Figure 7:
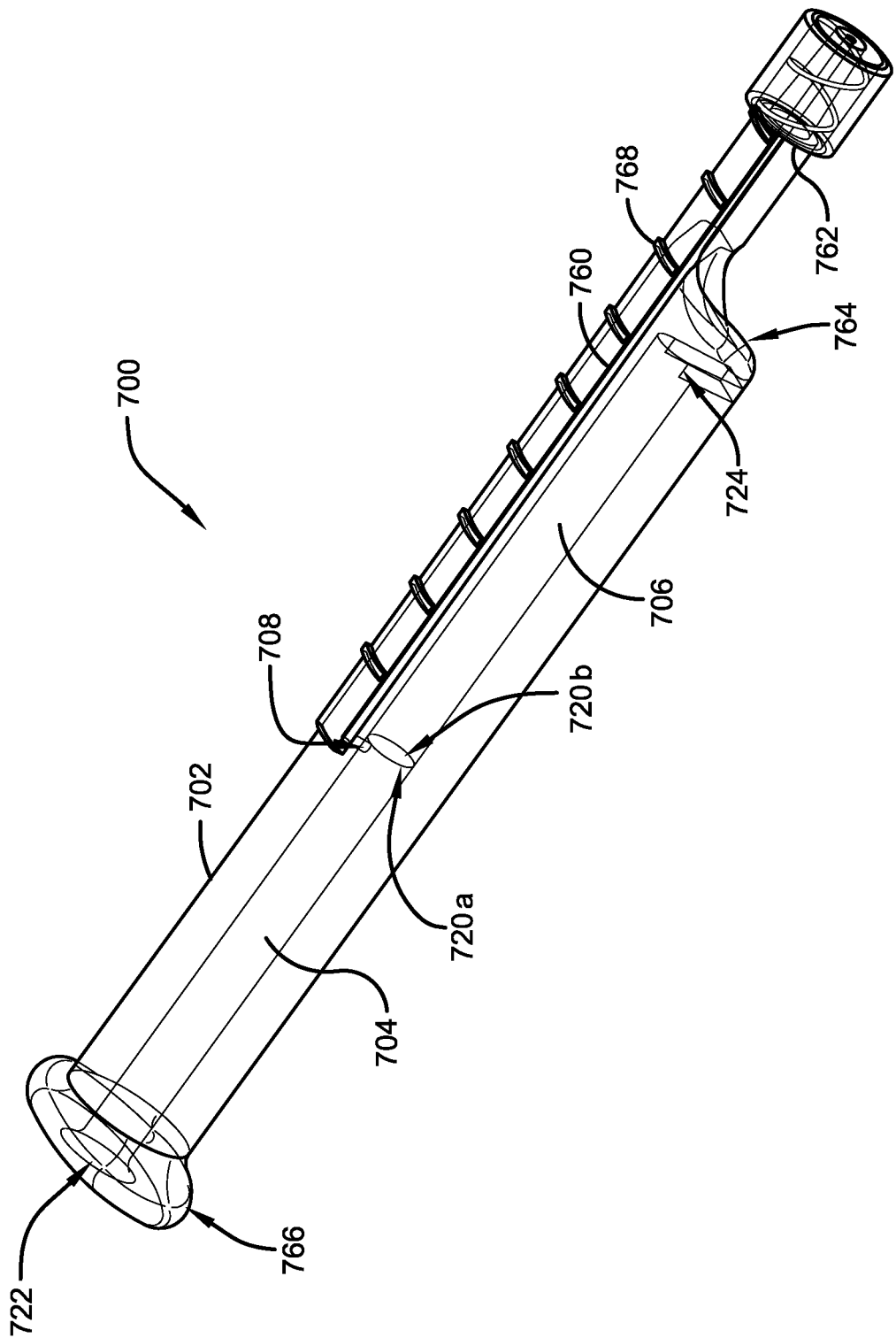
FIG. 7 is a perspective illustration of at least a portion of an example syringe device, which comprises one or more portions the systems described herein.
Figure 8:
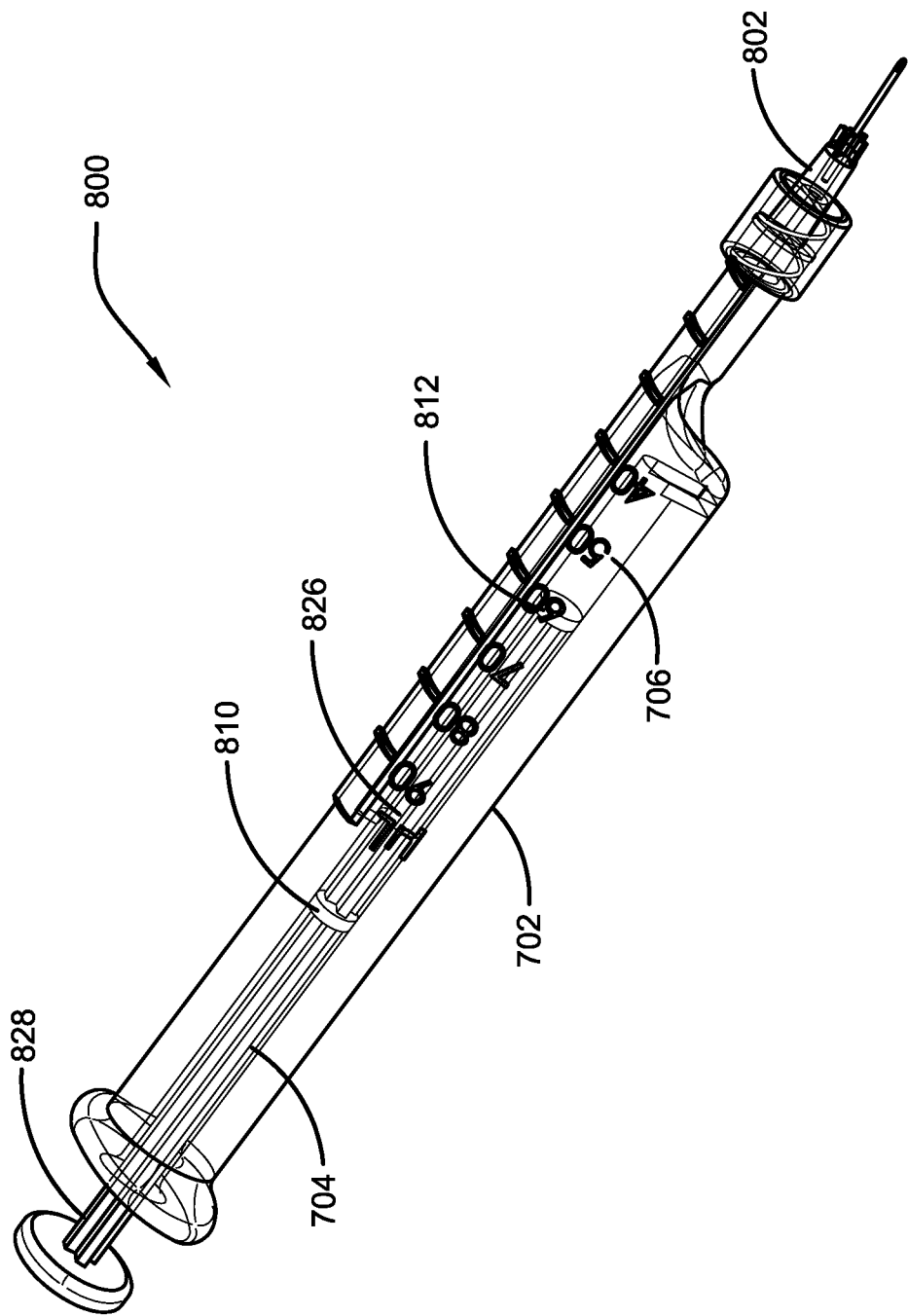
FIG. 8 is a perspective illustration of one or more portions of an example syringe device, which comprises one or more portions the systems described herein.

FIGS. 7 and 8 are perspective illustrations of one or more portion of an example syringe device 700, which comprise one or more portions the systems described herein. The example, syringe device 700 comprises a chamber body 702, a first chamber 704, and a second chamber 706. The first chamber 704 comprises a first end 722 and a second end 720a in fluid communication with a second end 720b of the second chamber 706, which further comprises a first end 724. The example, syringe device 700 can further comprise a fluid port 708 in fluid communication with the first chamber 704. The first end 722 of the first chamber 704 is in fluid communication with the outside of the chamber body 702; and the first end 724 of the second chamber 706 is in fluid communication with the outside of the chamber body 702.

In one implementation, the example, syringe device can comprise a graduated chamber 760 in fluid communication with the fluid port 708. The graduated chamber 760 may comprise graduation marks 768 configured to provide a visually guide for a volume of fluid disposed in the graduated chamber 760. In this implementation, the example, syringe device 700 can comprise a needle receiving component 762, configured to operably couple with a syringe needle module 802, for example, to provide a seal between the graduated chamber 760 and a needle. In one implementation, the needle receiving component 762 can comprise an appropriate coupling means for any type of needle or injection device, and is not limited to that depicted in FIG. 7. Further, in one implementation, the syringe device may comprise a fixed needle or injection device, for example, which is fixedly coupled with the syringe device.

As illustrated in FIG. 8, the example syringe device can comprise a first seal 810, disposed in the first chamber 704, and a second seal 812, disposed in the second chamber 706. Further, in one implementation, as illustrated in FIGS. 7 and 8, the example, syringe device 700 may comprise user interface features 764, 766, configured to facilitate use of the syringe device 700 by a user. Additionally, the first and second seals 810, 812 may be operably coupled by a coupler 826; and the first seal may be operably coupled with an actuator 828, configured to apply a translation force to the first seal 810, which in-turn may result in a translation force applied to the second seal 812, via the coupler 826.

A method may devised for transferring a low volume of fluid, using a syringe or pipette, such by using one or more of the apparatus, devices, syringes and/or pipettes described herein. That is, for example, a user may be able use an example pipette or syringe, using an amount of force and over a period of time that is typical of a large volume transfer, but it resulting in merely a low volume transfer of the fluid. As an example, the user may be able to apply an amount of force over a period of time equivalent to drawing or displacing ten milliliters, however, they may be merely drawing or displacing 10 microliters.

Figure 9:
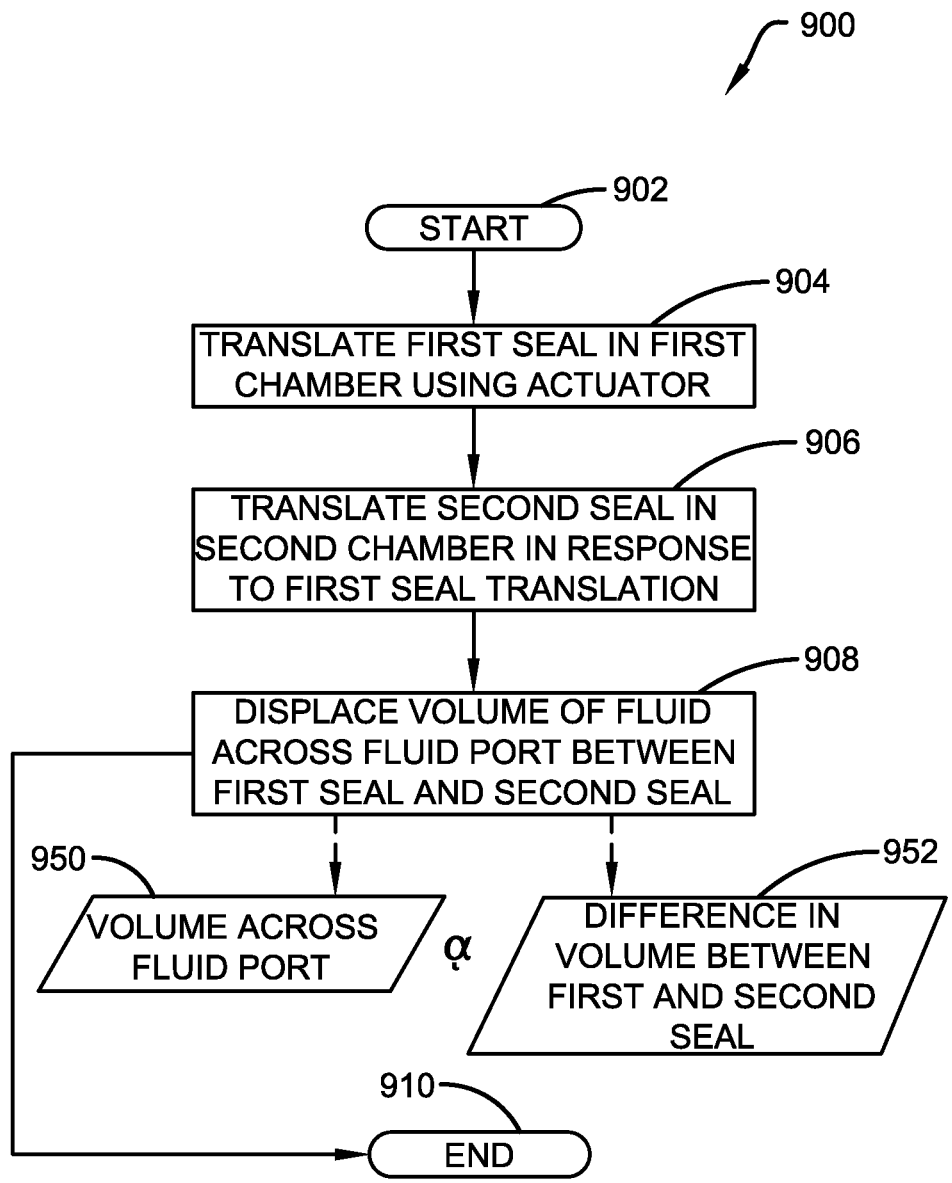
FIG. 9 is a flow diagram illustrating an exemplary method for transferring a low volume of fluid, using a syringe or pipette.

FIG. 9 is a flow diagram illustrating an exemplary method 900 for transferring a low volume of fluid, using a syringe or pipette. The exemplary method 900 begins at 902. At 904, a first seal is translated in a first chamber of a chamber body using an actuator that applies a translation force to the seal. At 906, a second seal is translated in a second chamber of the chamber body. In this implementation, the second chamber is in fluid communication with the first chamber, and the second seal is translated in response to the translation of the first seal.

At 908, as a result of the translation of the first and second seals, a volume of fluid 950 is displaced across a fluid port that can be disposed between the first seal and the second seal in the chamber body. In this implementation, the volume of fluid displaced 950 is substantially equivalent to a difference between a third volume and a fourth volume 952, where the third volume can be defined by an interior wall of the chamber body wall, the first seal and the second seal when the first seal and second seal are disposed in a first position. Further, the fourth volume can be defined by an interior wall of the chamber body wall, the first seal and the second seal when the first seal and second seal are disposed in a second position.

As an example, when the first seal is disposed at the first end of the first chamber, and the second seal is disposed at the second end of the second chamber, the third volume may comprise substantially all of the volume of the second chamber. Further, in this example, when the first seal is disposed at the second end of the first chamber, and the second seal is disposed at the first end of the second chamber, the fourth volume may comprise substantially all of the volume of the second chamber. Additionally, the third volume may be larger than the fourth volume, for example, where the third volume may comprise one or more milliliters and the fourth volume may be less than the third volume by one or more microliters. In this way, for example, the fifth volume may comprise one or more microliters. In one implementation, the volume of fluid displaced 950 across the fluid port may be less than or equal to one tenth of the third volume; less than or equal to one hundredth of the third volume; less than or equal to one, one thousandth of the third volume; or less than or equal to one, ten thousandth of the third volume (e.g., or some other ratio).

In one aspect, as illustrated in FIGS. 10A-10I, a plunger 1002 may be utilized by a pipette 1004 (e.g., syringe) to facilitate drawing a fluid into the pipette 1004, and subsequently dispensing the fluid from the pipette 1004. As described above, a pipette or syringe can be used to transfer fluid, such as a liquid or gas, from a first location to a second location. For example, the pipette or syringe may be used to draw a desired amount of medicine from a container, and dispense the medicine for a patient. In another implementation, the desired amount of medicine may be first introduced through a drug delivery system for the patient. As described above, the plunger 1002 may translate inside the chamber(s) of the pipette 1004, which can facilitate displacement (e.g., drawing or dispensing) of the fluid, which is further facilitated by one or more seals 1010 operably disposed on a shaft 1012 of the plunger 1002.

In one implementation, the plunger 1002 can be configured to provide for drawing a first volume of fluid into the pipette 1004. Further, the plunger may be configured to provide for dispensing the first volume of fluid from the pipette 1004, and dispensing a second volume of fluid from the pipette 1004. In one implementation, the second volume may comprise a blow-out volume, which may be utilized by a user to mitigate retention of a fluid by the pipette 1004. That is, for example, the blow-out volume may be initiated subsequent to dispensing the first volume, in order to further displace at least some of a fluid that may have been retained by the pipette or syringe (e.g., at a displacement port, such as due to surface tension or some other attraction between the pipette and a fluid). As an example, a liquid drawn into a chamber of the pipette 1004 may comprise the first volume. In this example, the plunger 1002 may be activated to dispense the liquid from the chamber, where the dispensing comprises displacement of the first volume. However, as an example, a portion of the liquid may remain engaged with the pipette, such as at the port, and the plunger 1002 can be used to dispense the eighth (e.g., blow-out) volume in order to attempt to displace the engaged liquid from the pipette 1004. This may be advantageous when attempting to transfer ultra-low volumes or specified volumes of fluid, for example.

In one implementation, the plunger 1002 may comprise a first biasing component 1008 (e.g., first spring, such as an action spring) and a second biasing component 1006 (e.g., a second spring, such as a blow-out spring). In this implementation, for example, the first biasing component 1008 may be selectively engaged with the shaft 1012 at a first shaft location 1040, and configured to provide a first biasing force to the plunger 1002 during displacement (e.g., drawing and/or dispensing) of the first volume. Further, in this implementation, for example, the second biasing component 1006 may be selectively engaged with the shaft 1012 at a second shaft location 1042, and configured to provide a second biasing force to the plunger 1002 during drawing of the first volume, and/or dispensing of the second volume. That is, for example, the action spring 1008 can bias the distal end 1018 of the plunger 1002 away from the distal end 1016 of the pipette 1004, thereby allowing a fluid to be drawn up into the pipette 1004 when a force applied to the distal end 1018 of the plunger 1002 (e.g., by the user) is reduced (e.g., the plunger is released by the user). Further, for example, the blow-out spring 1006 can bias the distal end 1018 of the plunger 1002 away from a boss location 1014 on the shaft 1012 during dispensing the first volume from the pipette 1004; where a distance (e.g., a second distance) between the boss location 1014 and the distal end of the plunger 1002 may be indicative of the second (blow-out) volume for the pipette 1004.

That is, for example, when the plunger 1002 is depressed into the pipette 1004 (e.g., translating a first distance), the first spring 1008 (e.g., action spring) can compress, and provide the first biasing force, while the second spring 1006 (e.g., blow-out spring) may not compress, at least until the surface of the pipette stop shoulder 1034 meets the distal end 1016 of the syringe 1004. In one implementation, in this example, the second biasing force can be greater than the first biasing force. In this implementation, application of a first compressing force can result in the action spring 1008 being compressed, for example, allowing the plunger to translate a first distance in the pipette, while the blow-out spring 1006 is not compressed by the first compressing force. Further, application of a second compressing force, which is greater than the first compressing force, for example, may allow the blow-out spring 1006 to be compressed, and may allow the plunger to translate a second distance in the pipette.

In one implementation, the proximal end of the action spring 1008 may selectively engage a shoulder 1048 disposed at or near a distal end 1016 of the pipette 1004. That is, for example, the shoulder 1048 may provide a mechanical stop for the action spring 1008, such that when the action spring 1008 is engaged with the shoulder 1048, and engaged with a boss stop 1022 at the boss location 1014, the action spring 1008 may be compressed when the plunger 1002 is depressed into the pipette 1004. Further, the plunger 1002 may comprise a distal stop 1024 configured to selectively engage the second biasing component 1006 (e.g., blow-out spring) at the distal end 1018. Additionally, the plunger 1002 may comprise a collar 1026, which can be selectively engaged with the plunger shaft 1012 at the boss location 1014. In one implementation, the collar 1026 may comprise a keyway 1028 configured to selectively engage with a corresponding key configuration of the boss stop 1022. That is, for example, the collar keyway 1028 may be aligned with the corresponding key configuration of the boss stop 1022, such that the collar 1026 may be slidably engaged with (e.g., slid into place at) the boss location 1014.

In one implementation, the collar 1026 may be rotated around the shaft 1012, such that a collar key stop 1046 (e.g., set of teeth keys) disposed on the collar 1026 do not aligned with the key configuration of the boss stop 1022. In this way, for example, the collar 1026 may be biased against the key configuration of the boss stop 1022 by the second biasing component 1006 (e.g., blow-out spring), thereby allowing the collar 1026 to remain in place during operation of the plunger 1002 and pipette 1004. In one implementation, the collar 1026 may comprise a second biasing component shoulder 1032 (e.g., a blow-out spring shoulder) and a pipette stop shoulder 1034. In this implementation, for example, the second biasing component shoulder 1032 may be configured to engage the proximal end of the second biasing component 1006, thereby providing a stop to mitigate the second biasing component 1006 translating toward the proximal end 1038 of the plunger when the second biasing component 1006 is compressed (e.g., compression of the blow-out spring).

Additionally, the pipette stop shoulder 1034 may provide a stop between the pipette 1004, at the distal end 1016, and collar 1026. That is, for example, the first compressing force can be applied to the distal end 1018 of the plunger 1002, resulting in the plunger 1002 being translated into the pipette 1004, at least until the pipette stop shoulder 1034 meets the distal end 1016 of the pipette 1004. In one implementation, the collar 1026 can be slidably engaged with the shaft 1012, allowing the collar 1026 to translate toward the distal end 1018 of the plunger 1002 when the second compressing force is applied to the distal end 1018 of the plunger 1002. For example, when the second compressing force is applied, the blow-out spring 1006 may begin to compress after the pipette stop shoulder 1034 has engaged with the distal end 1016 of the pipette 1004, allowing the collar 1026 to translate toward the distal end 1018 of the plunger 1002. In one implementation, the shaft 1012 can comprise a collar stop shoulder 1044 configured to provide a mechanical stop for the collar 1026 when it translates toward the distal end 1018 of the plunger 1002. That is, for example, the collar 1026 may continue to translate toward the distal end 1018 of the plunger 1002 at least until the collar key stop 1046 disposed on the collar 1026 meets the collar shoulder stop 1044 disposed on the shaft 1012. In this implementation, for example the proximal end 1038 of the plunger 1002 may also translate inside the pipette toward the proximal end 1036 of the pipette 1004, thereby providing the second volume (e.g., blow-out volume), which may be dispensed from the pipette 1004.

Further, in one implementation, at least a portion of the shaft 1012 (e.g., the second shaft location 1042) may be so dimensioned to accommodate merely the second biasing component 1006, such as the blow-out spring, for example, such that the blow-out spring 1006 is effectively retained on the shaft 1012 during pipette use. Further, in one implementation, at least a portion of the shaft 1012 (e.g., the first shaft location 1040) may be so dimensioned to accommodate merely the first biasing component 1008, such as the action spring. That is, for example, the dimension of the first shaft location 1040 may effectively retain the action spring 1008 in place during pipette operation. Additionally, in one implementation, the shaft 1012 may comprise one or more seal retention locations 1030. In this implementation, a first seal retention location 1030a may be configured to retain a first seal 1010a, and a second seal retention location 1030b may be configured to retain a second seal 1010b.

Figure 10A:
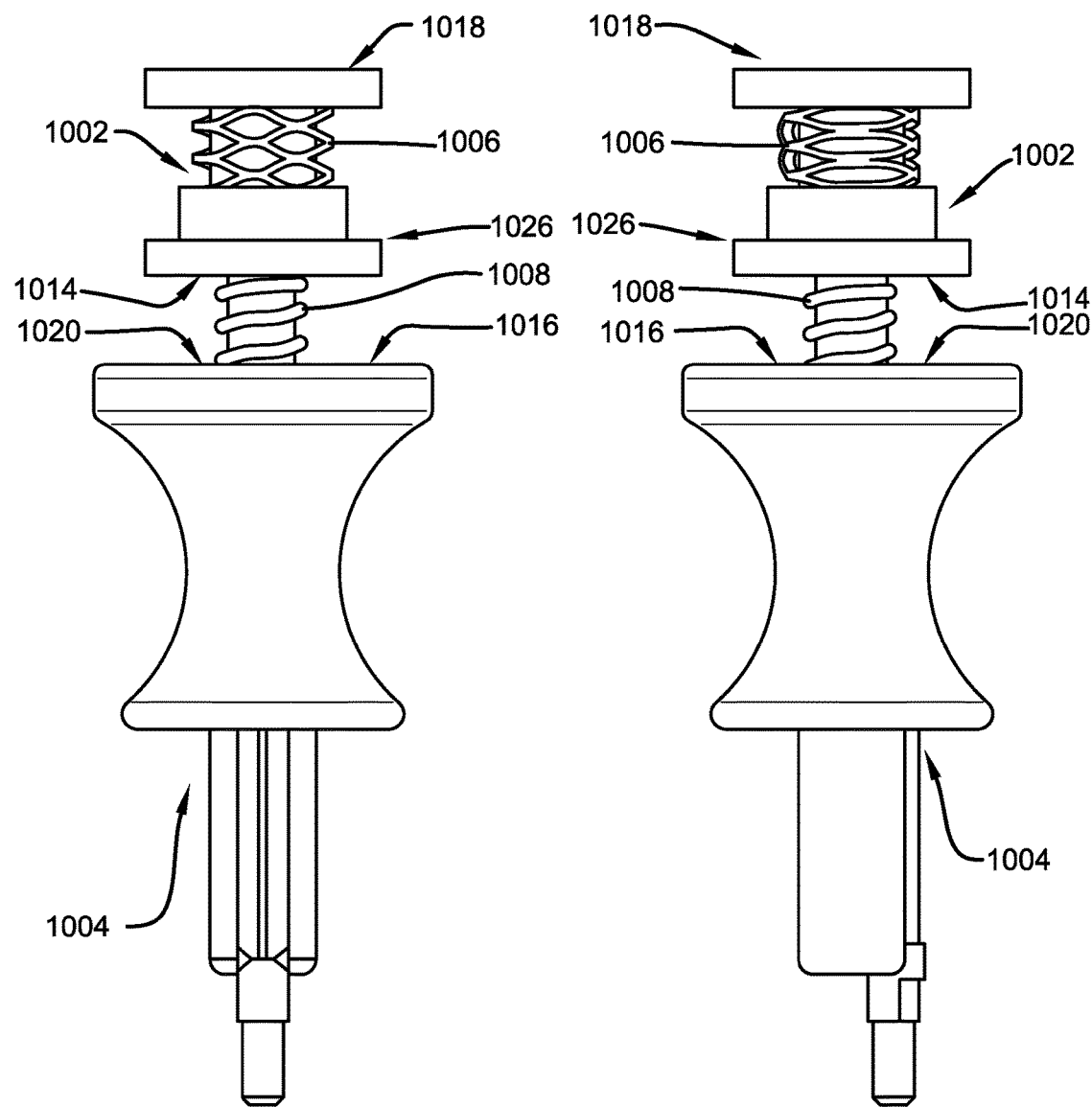
FIGS. 10A-10I are component diagrams illustrating a plurality of exemplary implementations of one or more portions of the systems and devices described herein.
Figure 10B:
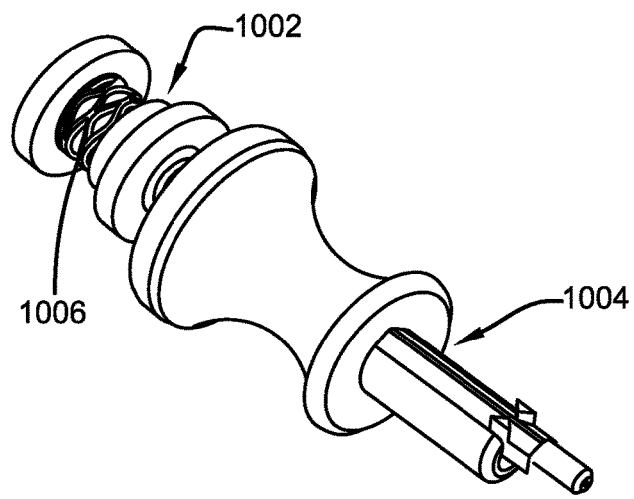
Figure 10C:
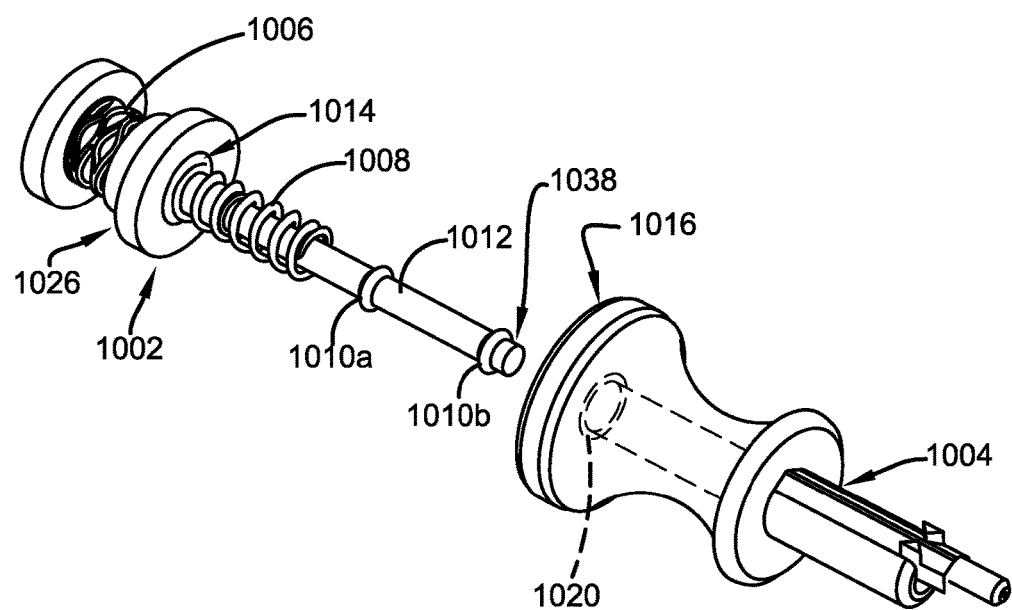
Figure 10D:
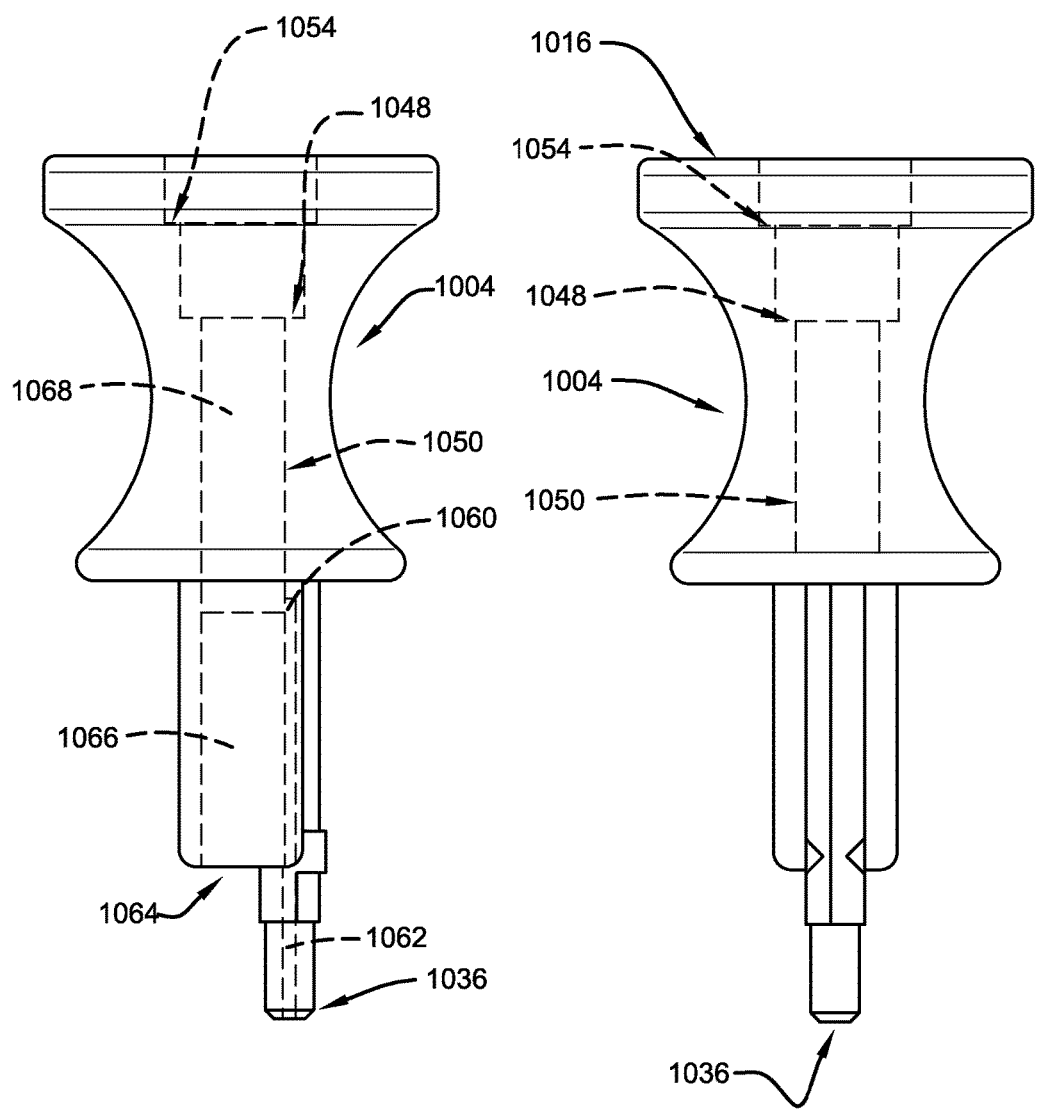

In one implementation, the pipette may comprise a first recessed pipette shoulder 1048, where the shoulder (e.g., pipette fillet 1020) can be recessed into the distal end 1016 of the pipette 1004, as illustrated in FIG. 10D. In this implementation, for example, the first biasing component 1008 may engage with the recessed pipette shoulder 1054 inside the distal end 1016 of the pipette 1004. Further, in one implementation, the shaft 1012 can comprise a shaft stop 1052, for example, which can be disposed within the first shaft location, where the first biasing component 1008 may be engaged on the shaft 1012. In this implementation, for example, the recessed pipette shoulder 1048 can be configured to provide a mechanical stop for the action spring 1008 when the plunger 1002, and therefore the shaft 1012, is translated toward the proximal end 1036 of the pipette 1004, such as when the first compressing force is applied to the distal end 1018 of the plunger 1002, the length of translation between the surface 1034 and surface 1016c an define the first volume. In other implementations, the volume can be modified to accommodate various volumes through any means chosen with sound engineering judgment. By way of nonlimiting example, the volume may be changed by adding a pin adjacent to the boss location 1014 or by changing the thickness of any components such as the various shoulders described herein.

In one implementation, the pipette can comprise a second recessed pipette shoulder 1054, which, for example, may comprise a larger diameter than the first recessed pipette shoulder 1048. In this implementation, for example, the second recessed pipette shoulder 1054 can be configured to provide a mechanical stop for the boss stop 1022 when the plunger 1002, and therefore the shaft 1012, is translated toward the proximal end 1036 of the pipette 1004, such as when the first and second compressing force are applied to the distal end 1018 of the plunger 1002. In this implementation, the length of translation between the boss stop 1022 and the second recessed pipette shoulder 1054 can define the second volume. That is, for example, the second volume of fluid drawn into or expelled out of the pipette may be directly related to the length of translation between the boss stop 1022 and the second recessed pipette shoulder 1054.

Figure 10E:
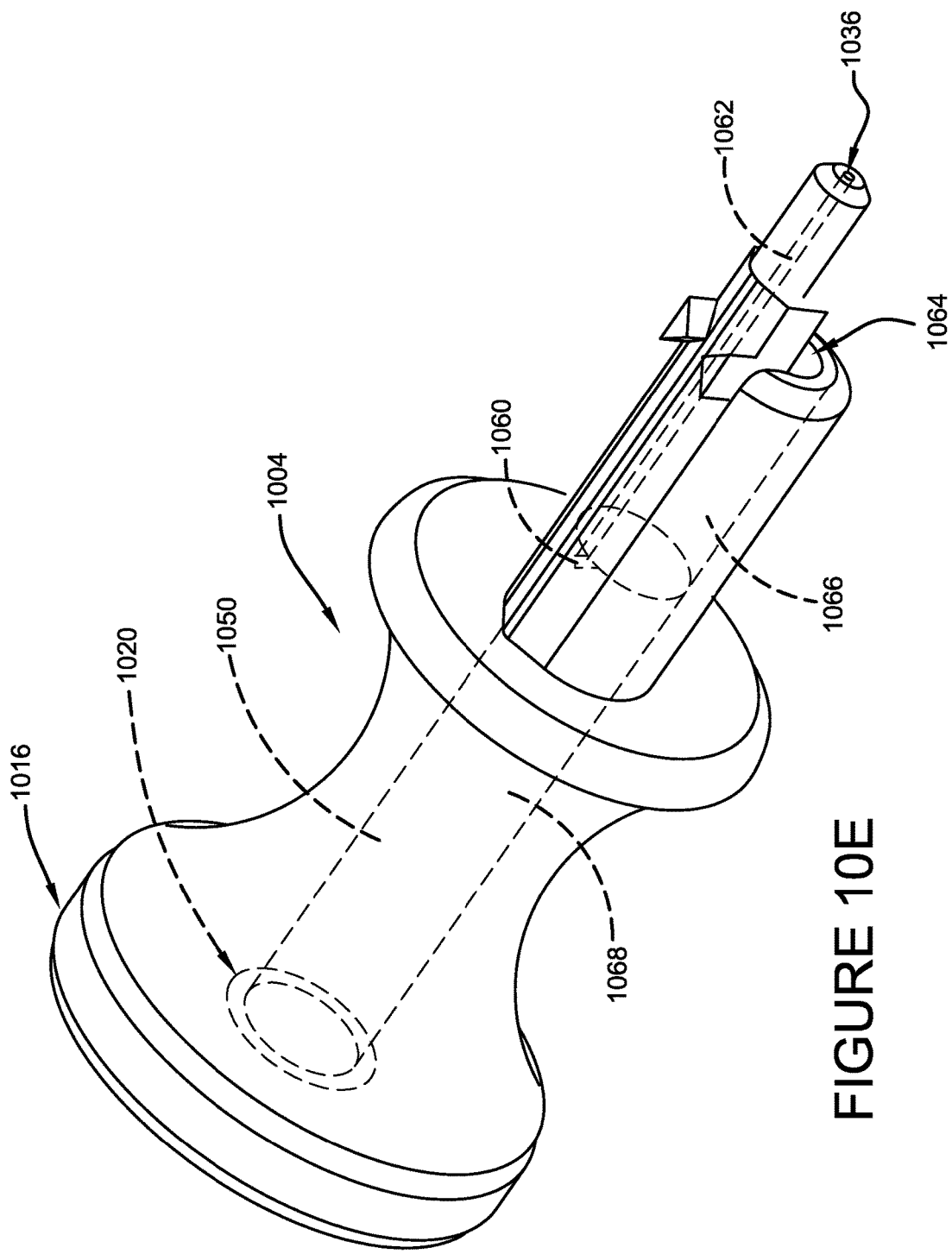
Figure 10F:
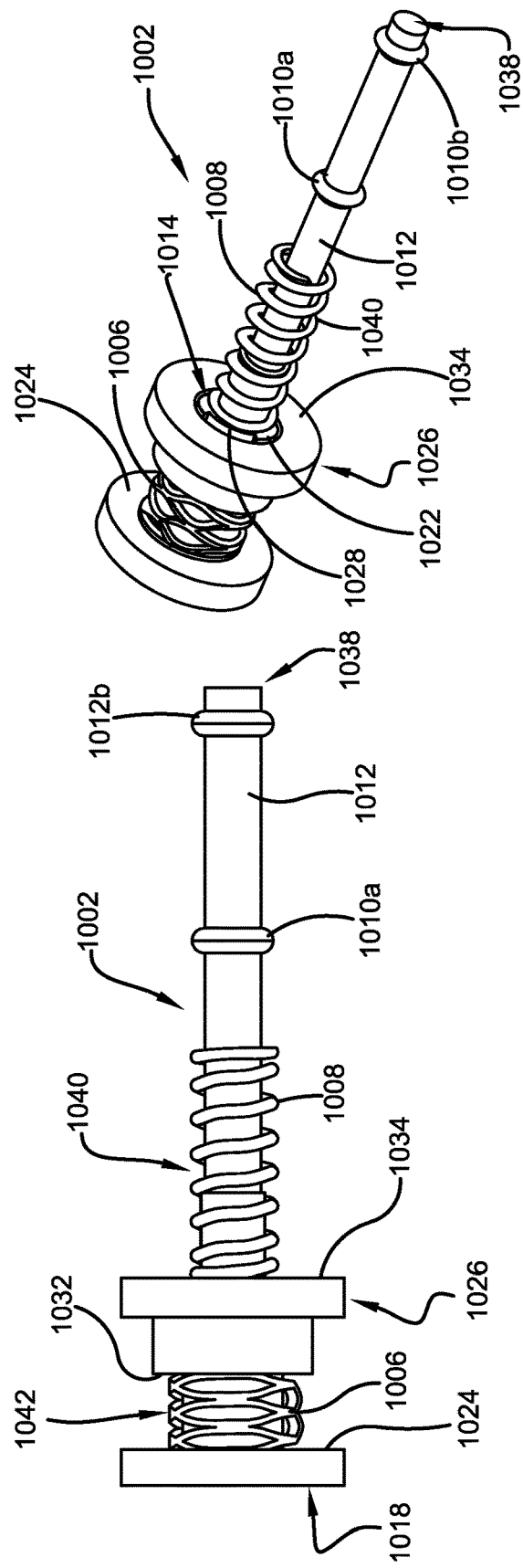
Figure 10G:
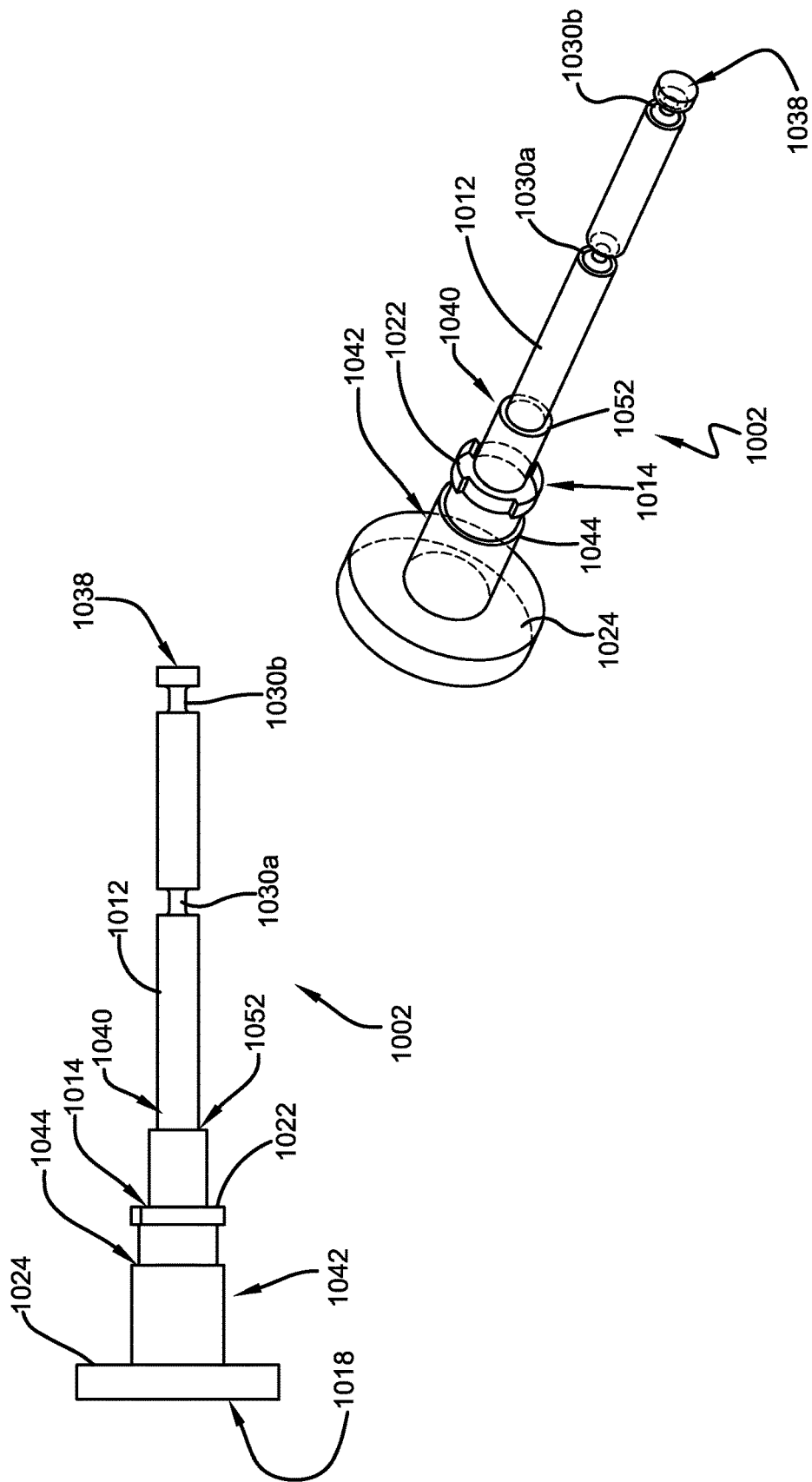
Figure 10H:
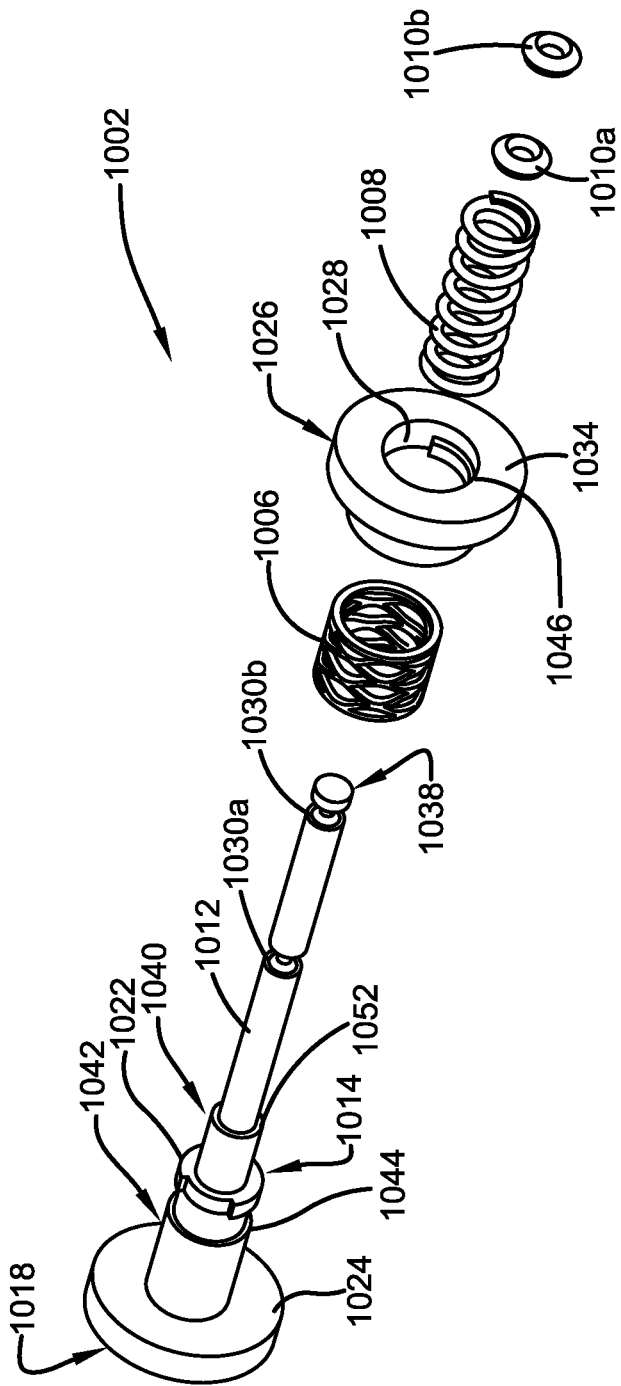
Figure 10:
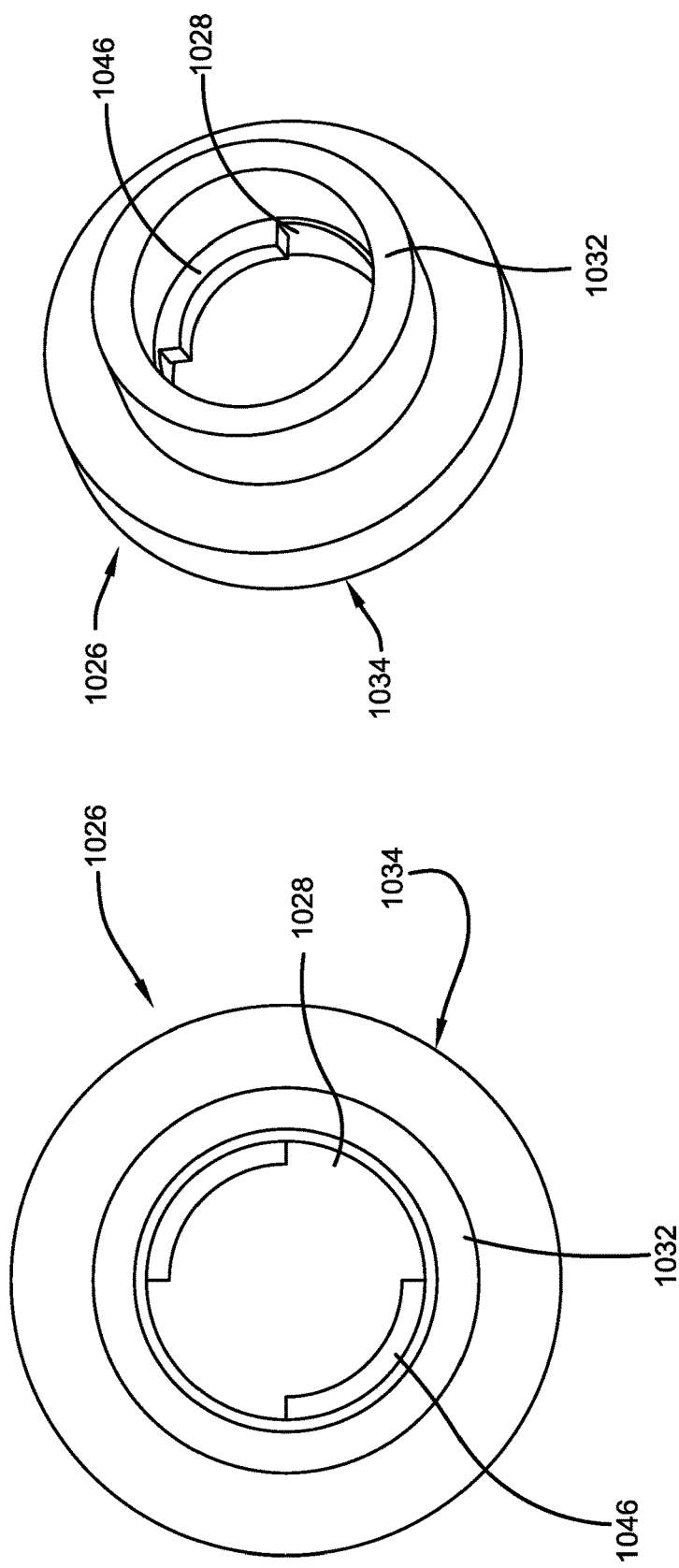

In one aspect, one or more portions of plunger apparatus may be used in a pipette and/or syringe device, such as those described above (e.g., in FIGS. 1-8), and/or may be used in an example method, such as described above (e.g., in FIG. 9). In this aspect, in one implementation, as illustrated in FIGS. 10D and 10E, an example pipette-type device 1004 may comprise a pipette shaft 1050, for example, which can be configured (e.g., dimensioned) to receive a plunger (e.g., 1002, or 580 of FIG. 5B), such that the plunger may slidably translate in the shaft 1050, resulting in fluid being drawn into and expelled from the pipette 1004. Further, in one implementation in this aspect, the shaft 1050 may comprise a first chamber 1068 (e.g., such as 104, 204, 504, 704 of FIGS. 1-8), and a second chamber 1066 (e.g., such as 106, 206, 506, 706 of FIGS. 1-9).

In one implementation, as illustrated in FIGS. 10D and 10E, the example pipette device 1004 can comprise a fluid port 1060 (e.g., 508, 708 of FIGS. 5 and 7 respectively), which may fluidly couple the pipette shaft 1050 with a fluid chamber 1062 (e.g., graduated chamber 560, 760 of FIGS. 5 and 7, respectively). In this implementation, for example, the fluid chamber 1062 can be configured to hold fluid. For example, the exemplary pipette device 1004 can be configured to draw fluid (e.g., a desired target liquid) into the fluid chamber 1062, such as by translating an engaged plunger away for the proximal end 1036 of the pipette 1004. In this example, translating and engaged plunger away for the proximal end 1036 of the pipette 1004 can result in translation of the first plunger seal (e.g., 1030a) and second plunger seal (e.g., 1030b), drawing a volume of fluid across the fluid port 1060 from the fluid chamber 1062 and into the first chamber 1068. In this example, the amount of fluid drawn into the proximal end 1036 of the pipette 1004 may be substantially equivalent to the volume of fluid drawn across the fluid port 1060 (e.g., as described above in FIG. 5).

Further, in one implementation, the pipette or syringe device 1004 can comprise a shaft port 1064 (e.g., first end of second chamber 524, 724 of FIGS. 5 and 7, respectively). As an example, the shaft port 1064 can be configured to receive fluid from outside the pipette 1004 (e.g., air in the environment outside the pipette) into the pipette shaft 1050 (e.g., the second chamber 1066 of the pipette shaft 1050) when a plunger is translated toward the distal end 1016 of the pipette 1004. Additionally, for example, the shaft port 1064 can be configured to expel fluid (e.g., air) from inside the pipette shaft 1050 to outside the pipette 1004 when a plunger is translated toward the proximal end 1036 of the pipette 1004.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. An apparatus for use as a pipette or syringe, comprising:
   a body of a syringe or pipette comprising a hollow interior chamber, a distal end and a proximal end;
   a plunger operably disposed in slidable engagement with the body of the pipette or syringe to create a fluid seal between the plunger and the chamber of the pipette or syringe, the plunger comprising a shaft, a distal end and proximal end;
   a first seal and second seal operably engaged with the shaft, respectively creating the fluid seal between the plunger and the interior chamber of the body of the pipette or syringe, the second seal disposed proximally from the first seal on the shaft at a desired displacement distance from the first seal, the desired displacement distance comprising:
      a distance of travel of the shaft in the body of the pipette or syringe that operably displaces a first volume of fluid at the proximal end of the body of the pipette or syringe; and
      a distance of travel of the shaft in the body of the pipette or syringe that operably displaces a second volume of fluid at the proximal end of the body of the pipette or syringe;
   a collar operably disposed in slidable engagement with the shaft;
   a first biasing component comprising a proximal end and a distal end, and the distal end of the first biasing component disposed in operable engagement with the shaft of the plunger proximally from the collar, and the proximal end of the first biasing component disposed in operable engagement with the with the body of the pipette or syringe, operably biasing the shaft of the plunger away from the body of the pipette or syringe with a first biasing force; and
   a second biasing component disposed in operable engagement with the plunger between the distal end of the plunger and the collar, operably biasing the distal end of the plunger and the collar away from each other with a second biasing force.

2. The apparatus of claim 1, the first biasing force is less than the second biasing force.

3. The apparatus of claim 1, comprising a distal stop disposed at the distal end of the plunger, wherein the second biasing component is disposed distally on the plunger from the first biasing component in contact with the distal stop disposed at the distal end of the plunger.

4. The apparatus of claim 1, the first biasing component further operably engaged with the body of the pipette or syringe, and, in combination with the collar, defining a first translation distance of the plunger in the body of the pipette or syringe, the first translation distance to operably displace a first volume of fluid between the interior and exterior of the interior chamber of the pipette or syringe at the proximal end of the pipette or syringe.

5. The apparatus of claim 4, wherein the plunger is operable such that translation of the plunger in the body of the syringe or pipette over the first translation distance toward the distal end of the of the body of the pipette or syringe resulting in drawing of the first volume of fluid into the interior chamber of the pipette or syringe at the proximal end of the pipette or syringe.

6. The apparatus of claim 4, the second biasing component engaged with the collar and the plunger at its distal end, and defining a second translation distance of the plunger in the body of the pipette or syringe, the second translation distance to operably displace a second volume of fluid from the proximal end of the interior chamber of the body of the pipette or syringe.

7. The apparatus of claim 1, comprising a boss stop fixedly engaged with the shaft, the boss stop to provide a stop for translation of the collar toward the proximal end of the plunger, the collar disposed on the shaft distally from the boss stop.

8. The apparatus of claim 7, the shaft comprising:
   a collar stop disposed on the shaft distally from the boss stop to provide a stop for translation of the collar toward the distal end of the plunger, and
   a collar translation distance, comprising a distance of translation for the collar between the boss stop and the collar stop, the collar translation distance to operably provide a distance of translation of the plunger in the body of the pipette or syringe to displace of a second volume of fluid at the proximal end of the interior chamber of the body of the pipette or syringe.

9. The apparatus of claim 1, comprising a boss stop fixedly engaged with the shaft, the boss stop to provide a stop for translation of the first biasing component toward the distal end of the plunger.

10. The apparatus of claim 1, the first seal sized to fit a larger diameter portion of the interior chamber than the second seal.

11. The apparatus of claim 1, comprising a plunger distal stop fixedly engaged with the shaft proximate the distal end of the shaft-to selectably engage with the second biasing component.

12. The apparatus of claim 1, comprising a shoulder disposed at the distal end of the interior chamber of the body of the pipette or syringe and the first biasing component is configured to operably engage with the body of the pipette or syringe at the shoulder disposed at the distal end of the interior chamber of the body of the pipette or syringe.

13. The apparatus of claim 1, the shaft comprising a boss stop and a shaft stop disposed proximally on the shaft from the boss stop, the shaft stop to engage with a recessed shoulder in the proximal end of the body of the pipette or syringe to stop translation of the plunger toward the proximal end of the body of the pipette or syringe.

14. The apparatus of claim 13, wherein the shaft stop is located on the shaft at a position to provide for translation of the plunger into the body of the pipette or syringe sufficient to displace a first volume of fluid at the proximal end of the body of the pipette or syringe.

15. A device for use as a pipette or syringe, comprising:
a body of a syringe or pipette comprising a hollow interior chamber, a distal end and a proximal end;
a plunger slidably, operably engaged with the body, and comprising:
a proximal end to create a fluid seal between the plunger and the interior chamber; and
a distal end to be engaged by a user;
a collar slidably, operably disposed on the plunger;
a first seal and second seal operably engaged with the plunger, respectively creating the fluid seal between the plunger and the interior chamber of the body of the pipette or syringe, the second seal disposed proximally from the first seal on the shaft at a desired displacement distance from the first seal, the desired displacement distance comprising:
a distance of travel of the plunger in the body of the pipette or syringe that operably displaces a first volume of fluid at the proximal end of the body of the pipette or syringe; and
a distance of travel of the plunger in the body of the pipette or syringe that operably displaces a second volume of fluid at the proximal end of the body of the pipette or syringe;
a first spring, comprising a proximal end and a distal end, and the distal end of the first spring operably engaged with the shaft of the plunger proximally from the collar at the first spring's distal end, and the proximal end of the first spring disposed in operable engagement with the body of the pipette or syringe to operably apply a first biasing force to the shaft of the plunger and the body of the pipette or syringe; and a second spring, operably engaged with the plunger proximate its distal end and, operably engaged with the collar to operably apply a second biasing force to the plunger and collar.

16. The device of claim 15, the first biasing force is less than the second biasing force.

17. The device of claim 16, the second spring, operably disposed distally on the plunger from the first spring.

18. The device of claim 15, comprising a boss stop fixedly disposed on the plunger, the boss stop to:
provide a stop for translation of the collar toward the proximal end of the plunger, the collar operably, slidably engaged with the plunger between the boss stop and the distal end of the plunger; and
provide a stop for translation of the first spring toward the distal end of the plunger.

19. The device of claim 15, the first seal sized to fit a larger diameter portion of the interior chamber than the second seal.

20. A system for transferring fluids, comprising:
a chamber body comprising a hollow interior chamber;
a plunger operably engaged with the chamber body to:
draw a first volume of fluid into the interior chamber;
dispense the first volume of fluid from the interior chamber; and
dispense a second volume of fluid from the interior chamber, subsequent to the dispensing of the first volume of fluid from the interior chamber, where the dispensing of the second volume of fluid mitigates retention of drawn fluid by the interior chamber;
a collar slidably, operably disposed on the plunger outside of the interior chamber;
a first seal and second seal operably engaged with the plunger, respectively creating the fluid seal between the plunger and the interior chamber of the body of the pipette or syringe, the second seal disposed proximally from the first seal on the shaft at a desired displacement distance from the first seal, the desired displacement distance comprising:
a distance of travel of the plunger in the body of the pipette or syringe that operably displaces a first volume of fluid at the proximal end of the body of the pipette or syringe; and
a distance of travel of the plunger in the body of the pipette or syringe that operably displaces a second volume of fluid at the proximal end of the body of the pipette or syringe;
a biasing assembly operably engaged with the plunger, comprising:
a first spring, comprising a proximal end and a distal end, and the distal end of the first spring operably engaged with the shaft of the plunger proximally from the collar, and the proximal end of the first spring disposed in operable engagement with the body of the pipette or syringe to operably apply a first biasing force to the shaft of the plunger and the body of the pipette or syringe; and
a second spring operably disposed between the distal end of the plunger and the collar, to operably apply a second biasing force to the plunger and collar, and the second biasing force is greater than the first biasing force.

* * * * *